US011329581B2

(12) United States Patent
Li et al.

(10) Patent No.: US 11,329,581 B2
(45) Date of Patent: May 10, 2022

(54) SHUNT SERIES WOUND DIRECT CURRENT (DC) MOTOR DRIVING DEVICE AND EQUIPMENT

(71) Applicant: UNIVERSITY OF SHANGHAI FOR SCIENCE AND TECHNOLOGY, Shanghai (CN)

(72) Inventors: Shaolong Li, Shanghai (CN); Aijuan Jin, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 17/299,324

(22) PCT Filed: Dec. 27, 2019

(86) PCT No.: PCT/CN2019/128982
§ 371 (c)(1),
(2) Date: Jun. 3, 2021

(87) PCT Pub. No.: WO2020/135663
PCT Pub. Date: Jul. 2, 2020

(65) Prior Publication Data
US 2022/0029565 A1 Jan. 27, 2022

(30) Foreign Application Priority Data

Dec. 29, 2018 (CN) .......................... 201811654403.2
Dec. 29, 2018 (CN) .......................... 201811654469.1
(Continued)

(51) Int. Cl.
*H02P 7/06* (2006.01)
(52) U.S. Cl.
CPC .................................... *H02P 7/06* (2013.01)

(58) Field of Classification Search
CPC ...................................................... H02P 7/06
See application file for complete search history.

(56) References Cited

U.S. PATENT DOCUMENTS

2019/0319523 A1* 10/2019 Jin ............................ H02P 7/05

FOREIGN PATENT DOCUMENTS

| CN | 101227136 A | 7/2008 |
| CN | 106602947 A | 4/2017 |

(Continued)

OTHER PUBLICATIONS

International Search Report in PCT/CN2019/128982, issued by ISA, dated Mar. 27, 2020.

(Continued)

*Primary Examiner* — Bickey Dhakal
*Assistant Examiner* — Devon A Joseph
(74) *Attorney, Agent, or Firm* — Zhu Lehnhoff LLP

(57) ABSTRACT

The present invention provides a shunt series wound direct-current (DC) motor driving device and electric equipment. The shunt series wound DC motor driving device provided by the present invention includes: a shunt series wound DC motor; a DC power supply; and a chopper, wherein the chopper comprises m chopping units, a control signal comprises m unit control signals that respectively correspond to the m chopping units and are formed according to a preset phase stagger rule; each of unit control signals comprises w switching control signals corresponding to w switching control ends in the corresponding chopping units; the m first power output ends of all the chopping units and the m second power output ends of all the chopping units respectively correspondingly form m pairs of power output terminals; the m pairs of external terminals of the shunt series wound DC motor are connected with the m pairs of power output terminals in a one-to-one correspondence manner, (Continued)

wherein m is a positive integer that is not less than 2, and w is 1, 2 or 4.

20 Claims, 14 Drawing Sheets

(30) Foreign Application Priority Data

Dec. 29, 2018 (CN) .......................... 201811654473.8
Dec. 29, 2018 (CN) .......................... 201811654503.5
Dec. 29, 2018 (CN) .......................... 201811654523.2
Dec. 29, 2018 (CN) .......................... 201811654547.8

(56) References Cited

FOREIGN PATENT DOCUMENTS

| | | |
|---|---|---|
| CN | 106655924 A | 5/2017 |
| EP | 0181938 A1 | 5/1986 |
| TW | 202523 B | 3/1993 |

OTHER PUBLICATIONS

Written Opinion of the International Search Report in PCT/CN2019/128982 issued by ISA, dated Mar. 27, 2020.

\* cited by examiner

SHUNT SERIES WOUND DIRECT CURRENT (DC) MOTOR DRIVING DEVICE AND EQUIPMENT

TECHNICAL FIELD

The present invention belongs to the field of DC motors, and particularly relates to a shunt series wound DC motor driving device and electric equipment including the shunt series wound DC motor driving device.

BACKGROUND

A shunt series wound DC motor is a compound wound direct current motor, which contains 2 sets of exciting windings, respectively a shunt exciting winding and a series exciting winding. The armature winding of the shunt series wound DC motor is subjected to shunt excitation with the shunt exciting winding and then subjected to series excitation with the series exciting winding. A motor with an enhanced magnetic field produced by the series exciting winding and the shunt exciting winding in the same direction is a cumulative compounded DC motor. The cumulative compounded motor integrates advantages of a series DC motor and a shunt DC motor, is large in starting torque at a low speed, runs at a high speed under a light load, avoids galloping possibility, and is particularly suitable for crane operating conditions, that is, heavy-load large-torque start. The cumulative compounded motor may operate at a low speed under a heavy load and operate at a high speed under the light load, thereby ensuring operating safety and efficiency. The cumulative compounded motor also has obvious advantages in driving large-load vehicles such as electric pallets, rail cars, sightseeing vehicles, trucks, and ships.

As shown in FIG. 6, throughout hundreds of years of history of motor development, a traditional shunt series wound DC motor driving device 200 is composed of a shunt series wound DC motor and a chopper. The shunt series wound DC motor is only provided with one pair of external wiring terminals; and the pair of external wiring terminals are correspondingly electrically connected with one pair of power output terminals of the chopper. To ensure system reliability, maximum output current of the chopper is generally 2-3 times that of rated current of the motor. A high-power high-performance shunt series wound DC motor, particularly a low-voltage large-current shunt series wound DC motor, needs a chopper having extremely large continuous operating current. However, switching components in related choppers are expensive, and the maximum output current of the chopper used by the high-performance motor that can be purchased in the market is only less than one thousand amperes, thereby seriously restricting and affecting the development of the low-voltage large-current shunt series wound DC motor.

The chopper controls switch-on and off of power switch tubes to change output voltage and output current by a pulse width modulation technology. The size of output current ripple is in direct proportion to sizes of output torque ripple and rotation speed ripple of the motor and is also inversely proportional to switching frequency of the power switch tubes, while switching loss (or temperature rise and a failure rate) of the power switch tubes is in direct proportion to the switching frequency of the power switch tubes. Therefore, to decrease the output current, torque and rotation speed ripple of the motor, the switching frequency must be increased. However, to decrease the switching loss of the power switch tubes, the switching frequency of the power switch tubes must be decreased. Such a contradictory relation affects the development of the shunt series wound DC motor driving device, so that the shunt series wound DC motor driving device is difficult to be applied to numerically-controlled machine tools and other devices having strict requirements on the rotation speed and the torque ripple. For example, due to invisible requirements, the shunt series wound DC motor applied to national defense equipment shall greatly decrease the own vibration and noise, that is, requirements on the output torque ripple and the current ripple are particularly strict. At present, the traditional shunt series wound DC motor applied to high-power national defense equipment difficultly deals with an increasingly advanced investigation technology.

Based on the above reasons, the development of the shunt series wound DC motor driving device is restricted and affected, thereby further affecting development of electrical equipment including electric cars, electric ships and electric aircrafts, even electric war chariots, electric warships, electric aircrafts and electrically driven aircraft carriers in national defense, and affecting economic construction and national defense construction.

SUMMARY OF THE INVENTION

The present invention is provided for solving the above problems. The purpose of the present invention is to provide a shunt series wound DC motor driving device and electrical equipment including the shunt series wound DC motor driving device.

In order to achieve the above objectives, the present invention adopts the following technical solutions:

<Structure One>

The present invention provides a shunt series wound DC motor driving device. The shunt series wound DC motor driving device includes a shunt series wound DC motor having a rated voltage; a DC power supply having a constant voltage that corresponds to the rated voltage; a chopper that converts the constant voltage into a variable voltage based on a control signal and provides the variable voltage for the shunt series wound DC motor. The chopper is provided with m chopping units; each of the chopping units is provided with a first power output end, a second power output end and w switching control ends; the control signal includes m unit control signals that respectively correspond to the m chopping units and are formed according to a preset phase stagger rule; each of the unit control signals includes w switching control signals that correspond to the w switching control ends in the corresponding chopping units; the w switching control ends are used for correspondingly receiving the w switching control signals; and m first power output ends of all the chopping units and m second power output ends of all the chopping units respectively correspondingly form m pairs of power output terminals. The shunt series wound DC motor includes m pairs of electric brushes; a stator, including m pairs of main poles corresponding to the m pairs of electric brushes and further including a series exciting winding part and a shunt exciting winding part; and a rotor that is arranged in the stator and including a plurality of armature windings connected in a one-to-one correspondence manner in a preset connection manner. Each pair of the main poles includes an S-polarity main pole and an N-polarity main pole; two adjacent main poles have different polarities; two electric brushes in each pair of electric brushes have adjacent positions; and each pair of the electric brushes includes an S-pole corresponding electric brush that corresponds to the S-polarity main pole and an N-pole corresponding electric brush that corresponds to the N-polarity main pole. The series exciting winding part includes m series exciting winding units; and the shunt exciting winding part includes m shunt exciting winding units. Each of the series exciting winding units is formed by respectively making series exciting coils from insulated conductor strips composed of metal wires coated with insulating layers on at least one pair of corresponding main poles. Each of the shunt exciting winding units is formed by respectively making shunt exciting coils from insulated conductor strips composed of metal wires coated with insulating layers on at least one pair of corresponding main poles. The insulated conductor strip in each of the series exciting winding units is provided with one series excitation end and the other series excitation end; and the insulated conductor strip in each of the shunt exciting winding units is provided with one shunt excitation end and the other shunt excitation end. The m shunt excitation ends of the insulated conductor strips in all the shunt exciting winding units are electrically connected with m S-pole corresponding electric brushes in all the electric brushes to form m first electrical connection points; at the same time, the m other ends of the insulated conductor strips in all the shunt exciting winding units are electrically connected with m N-pole corresponding electric brushes in all the electric brushes to form m second electrical connection points; or, m other shunt excitation ends of the insulated conductor strips in all the shunt exciting winding units are electrically connected with m S-pole corresponding electric brushes in all the electric brushes to form m first electrical connection points; at the same time, the m one end of the insulated conductor strips in all the shunt exciting winding units are electrically connected with m N-pole corresponding electric brushes in all the electric brushes to form m second electrical connection points; the m series excitation ends of the insulated conductor bars in all series exciting winding units are connected to the m first electrical connection points respectively, at the same time, the m other series excitation ends of the insulated conductor strips in all the series exciting winding units form m first wiring terminals; or, the m other series excitation ends of the insulated conductor bars in all series field winding units are connected to the m first electrical connection points respectively, and at the same time, the m series excitation ends of the insulated conductor strips in all the series exciting winding units form m first wiring terminals, m second electrical connection points form m second wiring terminals, the m first wiring terminals and the m second wiring terminals respectively and correspondingly form m pairs of external wiring terminals; and the m pairs of external wiring terminals are connected with m pairs of power output terminals in a one-to-one correspondence manner, m is a positive integer not less than 2, and w is 1, 2, or 4.

The shunt series wound DC motor driving device provided by the present invention may have characteristics as follows: w is equal to 1; each of the chopping units is further provided with an upper bridge arm and a lower bridge arm connected in series with each other; the upper bridge arm is connected with a positive pole of the DC power supply; the lower bridge arm is connected with a negative pole of the DC power supply; the upper bridge arm includes at least one power switch tube and a switching control end; each power switch tube is provided with a control pole; the switching control end is formed based on the control pole; the lower bridge arm includes at least one diode; the first power output end is arranged between the upper bridge arm and the lower bridge arm; and the second power output end is arranged at the connection end of the lower bridge arm and the DC power supply.

The shunt series wound DC motor driving device provided by the present invention may have characteristics as follows: the preset phase stagger rule is that phases of the m switching control signals are respectively staggered by 1/m switching cycle in sequence; or, m is an even number, and the preset phase stagger rule is that the phases of the m switching control signals are respectively staggered by 2/m switching cycle in sequence.

The shunt series wound DC motor driving device provided by the present invention may have characteristics as follows: w is equal to 2; each of the chopping units is further provided with an upper bridge arm and a lower bridge arm connected in series with each other; the upper bridge arm is connected with a positive pole of the DC power supply; the lower bridge arm is connected with a negative pole of the DC power supply; the upper bridge arm and the lower bridge arm respectively include at least one power switch tube, at least one diode in reverse parallel connection with the power switch tube, and a switching control end; each power switch tube is provided with a control pole; the switching control end is formed based on the control pole; the switching control end in the upper bridge arm serves as an upper bridge arm switching control end, and the switching control end in the lower bridge arm serves as a lower bridge arm switching control end, used for correspondingly receiving two switching control signals; the first power output end is arranged between the upper bridge arm and the lower bridge arm; and the second power output end is arranged at the connection end of the lower bridge arm and the DC power supply.

The shunt series wound DC motor driving device provided by the present invention may have characteristics as follows: in each of the chopping units, the switching control signal that corresponds to the upper bridge arm switching control end is set as a reference switching control signal; a phase of the reference switching control signal is set according to a preset phase corresponding to the control signal; a switching control signal that corresponds to the lower bridge arm switching control end is set reciprocal to the reference switching control signal; the preset phase stagger rule is as follows: m phases that respectively correspond to the m unit control signals serving as m preset phases are staggered by 1/m switching cycle in sequence; or, m is an even number, and the preset phase stagger rule is as follows: m phases that respectively correspond to the m unit control signals serving as m preset phases are staggered by 2/m switching cycle in sequence.

The shunt series wound DC motor driving device provided by the present invention may have characteristics as follows: w is equal to 4; each of the chopping units is further provided with a first bridge arm and a second bridge arm connected in parallel with each other; the first bridge arm includes a first upper bridge arm and a first lower bridge arm connected in series with each other; the second bridge arm includes a second upper bridge arm and a second lower bridge arm connected in series with each other; the first upper bridge arm and the second upper bridge arm are connected with the positive pole of the DC power supply; the first lower bridge arm and the second lower bridge arm are connected with the negative pole of the DC power supply; the first upper bridge arm, the first lower bridge arm, the second upper bridge arm and the second lower bridge arm respectively include at least one power switch tube, at least one diode in reverse parallel connection with the power switch tube, and a switching control end; each power switch tube is provided with a control pole; the switching control end is formed based on the control pole; the switching control end in the first upper bridge arm serves as a first upper bridge arm switching control end, a switching control end in the first lower bridge arm serves as a first lower bridge arm switching control end, a switching control end in the second upper bridge arm serves as a second upper bridge arm switching control end, and a switching control end in the second lower bridge arm serves as a second lower bridge arm switching control end, used for correspondingly receiving four switching control signals; the first power output end is arranged between the first upper bridge arm and the first lower bridge arm; and the second power output end is arranged between the second upper bridge arm and the second lower bridge arm.

The shunt series wound DC motor driving device provided by the present invention may have characteristics as follows: in each of the chopping units, two switching control signals that correspond to the first upper bridge arm switching control end and the second lower bridge arm switching control end are set as reference switching control signals. Phases of the reference switching control signals are set according to preset phases corresponding to the unit control signals. Two switching control signals that correspond to the first lower bridge arm switching control end and the second upper bridge arm switching control end are set reciprocal to the reference switching control signals. The preset phase stagger rule is as follows: m phases that respectively correspond to the m unit control signals serving as m preset phases are staggered by 1/m switching cycle in sequence; or, m is an even number, and the preset phase stagger rule is as follows: m phases that respectively correspond to the m unit control signals serving as the m preset phases are staggered by 2/m switching cycle in sequence.

The shunt series wound DC motor driving device provided by the present invention may have characteristics as follows: the m series exciting winding units respectively correspond to the m pairs of main poles; the insulated conductor strip in each of the series exciting winding units is formed on one corresponding pair of main poles; the m shunt exciting winding units respectively correspond to the m pairs of main poles; and the insulated conductor strip in each of the shunt exciting winding units is formed on one corresponding pair of main poles.

The shunt series wound DC motor driving device provided by the present invention may have characteristics as follows: series exciting coils in the series exciting winding units on the various main poles have the same number of turns; shunt exciting coils in the shunt exciting winding units on the various main poles have the same number of turns; the series exciting coils and the shunt exciting coils on each of the main poles have the same current surrounding direction; each pair of the main poles corresponds to spatial locations of one corresponding pair of electric brushes; in each of the series exciting winding units, a connection relationship of two series exciting coils is any one of series connection and parallel connection, and the connection relationship of two series exciting coils in each series exciting winding unit is the same; and in each of the shunt exciting winding units, a connection relationship of two shunt exciting coils is any one of the series connection and parallel connection, and the connection relationship of two shunt exciting coils in each shunt exciting winding unit is same.

The shunt series wound DC motor driving device provided by the present invention may have characteristics as follows: the insulated conductor strips in each of the series exciting winding units are formed on the m pairs of main poles; and the insulated conductor strips in each of the shunt exciting winding units are formed on the m pairs of main poles.

The shunt series wound DC motor driving device provided by the present invention may have characteristics as follows: the series exciting coils in the series exciting winding units on the various main poles have the same number of turns; the shunt exciting coils in the shunt exciting winding units on the various main poles have the same number of turns; the series exciting coils and the shunt exciting coils on each of the main poles have the same current surrounding direction; in each of the series exciting winding units, a connection relationship of 2m series exciting coils is any one of series connection, parallel connection and series-parallel connection, and the connection relationship of the 2m series exciting coils is the same in each of the series exciting winding units; and in each of the shunt exciting winding units, a connection relationship of 2m shunt exciting coils is any one of series connection, parallel connection and series-parallel connection, and the connection relationship of the 2m shunt exciting coils is same in each of the shunt exciting winding units.

The shunt series wound DC motor driving device provided by the present invention may have characteristics as follows: the preset connection manner may be any one of single lap, multiplex lap and compound ripple.

<Structure Two>

The present invention further provides electrical equipment. The electrical equipment includes a shunt series wound DC motor driving device, wherein the shunt series wound DC motor driving device is the shunt series wound DC motor driving device in the <Structure One>.

The electrical equipment provided by the present invention may have characteristics as follows: the electrical equipment is any one of electric trucks, track cars, sightseeing tourist cars, trucks and ships etc.

ACTIONS AND EFFECTS OF THE PRESENT INVENTION

According to the shunt series wound DC motor driving device and the electrical equipment including the shunt series wound DC motor driving device involved in the present invention, the chopper is provided with the m chopping units; each of the chopping units is provided with the first power output end, the second power output end and w switching control ends; the control signal includes m unit control signals that respectively correspond to the m chopping units and are formed according to a preset phase stagger rule; each of the unit control signals includes w switching control signals that correspond to the w switching control ends in the corresponding chopping units; the w switching control ends are used for correspondingly receiving the w switching control signals; and m first power output ends of all the chopping units and m second power output ends of all the chopping units respectively correspondingly form m pairs of power output terminals. The shunt series wound DC motor includes m pairs of electric brushes; the stator, including m pairs of main poles corresponding to the m pairs of electric brushes and further including a series exciting winding part and a shunt exciting winding part; and the rotor that is arranged in the stator and including a plurality of armature windings connected in a one-to-one correspondence manner in a preset connection manner. Each pair of the main poles includes the S-polarity main pole and the N-polarity main pole; two adjacent main poles have different polarities; two electric brushes in each pair of electric brushes have adjacent positions; and each pair of the electric brushes includes an S-pole corresponding electric brush that corresponds to the S-polarity main pole and an N-pole corresponding electric brush that corresponds to the N-polarity main pole. The series exciting winding part includes m series exciting winding units; and the shunt exciting winding part includes m shunt exciting winding units. Each of the series exciting winding units is formed by respectively making series exciting coils from insulated conductor strips composed of metal wires coated with insulating layers on at least one pair of corresponding main poles. Each of the shunt exciting winding units is formed by respectively making shunt exciting coils from insulated conductor strips composed of metal wires coated with insulating layers on at least one pair of corresponding main poles. The insulated conductor strip in each of the series exciting winding units is provided with one series excitation end and the other series excitation end; and the insulated conductor strip in each of the shunt exciting winding units is provided with one shunt excitation end and the other shunt excitation end. The m shunt excitation ends of the insulated conductor strips in all the shunt exciting winding units are electrically connected with m S-pole corresponding electric brushes in all the electric brushes to form m first electrical connection points; at the same time, m other end of the insulated conductor strips in all the shunt exciting winding units are electrically connected with m N-pole corresponding electric brushes in all the electric brushes to form m second electrical connection points; or, m other shunt excitation ends of the insulated conductor bars in all shunt exciting winding units are electrically connected with m S-pole corresponding electric brushes in all the electric brushes to form m first electrical connection points correspondingly; at the same time, m one ends of the insulated conductor bars in all shunt exciting winding units are electrically connected with m N-pole corresponding electric brushes in all the electric brushes to form m second electrical connection points; and m series excitation ends of insulated conductor bars in all series exciting winding units are connected to the m first electrical connection points respectively; at the same time, m other series excitation ends of the insulated conductor bars in the series excitation winding unit form m first terminals; or, m other series excitation ends of insulated conductor bars in all series exciting winding units are connected to the m first electrical connection points respectively; at the same time, m series excitation ends of the insulated conductor bars in the series excitation winding unit form m first terminals, m second electrical connection points form m second terminals, m first terminals and m second terminals respectively form m pairs of external connection terminals, m pairs of external connection terminals and m pairs of power output terminals are connected in a one-to-one correspondence, m is a positive integer not less than 2, and w is 1, 2 or 4; therefore, on the one hand, a branch circuit composed of each shunt exciting winding unit and the pair of electric brushes and the series exciting winding unit that are in corresponding connection is mutually independent; current of each branch circuit is also independent; each branch circuit can independently work and power of each branch circuit is independently provided by one pair of corresponding power output terminals, i.e., each pair of the power output terminals only undertakes operating current of one branch circuit, wherein the operating current is only 1/m of rated input current of the motor. Therefore, even for the motor having extremely large rated input current, as long as the m is greater enough, the operating current of each branch circuit or output current of each pair of the power output terminals will be corresponding decreased, so that according to the low enough output current of the power output terminals, requirements on the high-power high-performance motor can be met without adopting a parallel current evenness technology but by using an ordinary power switch tube or a power module. Moreover, cost of the chopper is decreased; requirements of connecting wires and connectors between the external wiring terminals and the power output terminals on contact resistance and insulation are lowered; production and manufacture difficulty is lowered; and reliability and safety of the system are increased.

On the other hand, since the control signal includes the m unit control signals that respectively correspond to the m chopping units and are formed according to the preset phase stagger rule, current ripple phases of each pair of the power output terminals are mutually different. Therefore, peak values of ripple peaks of the m superposed current ripples are decreased; peak values of ripple peaks of the output torque and the rotation speed are further decreased; the performance of the shunt series wound DC motor is increased; and service life of the motor is prolonged.

Further, when the electric brushes, the exciting winding units and the connecting wires in the motor fail, only the parts at which failures are located shall be masked, and the other normal parts may still work. Thus, a phenomenon that the traditional shunt series wound DC motor is suddenly out of control in the case of failure can be avoided; and the reliability and safety of the system are increased.

In summary, the shunt series wound DC motor driving device in the present invention is simple in structure, short in connecting wire, simple in production process, easy to manufacture, convenient to maintain and low in production cost and maintenance cost, and has the advantages of reasonable structural design, simplicity and high reliability and safety. Therefore, the shunt series wound DC motor driving device in the present invention can be applied to heavy-load electrical equipment such as electric cars, electric trucks, track cars, sightseeing tourist cars, trucks and ships, and can be further applied to high-performance electrical equipment such as numerically-controlled machine tools and submarines.

DETAILED DESCRIPTION OF THE PREFERRED EMBODIMENTS

The specific embodiments of the present invention will be described below with reference to the accompanying drawings.

Embodiment One

Figure 1:
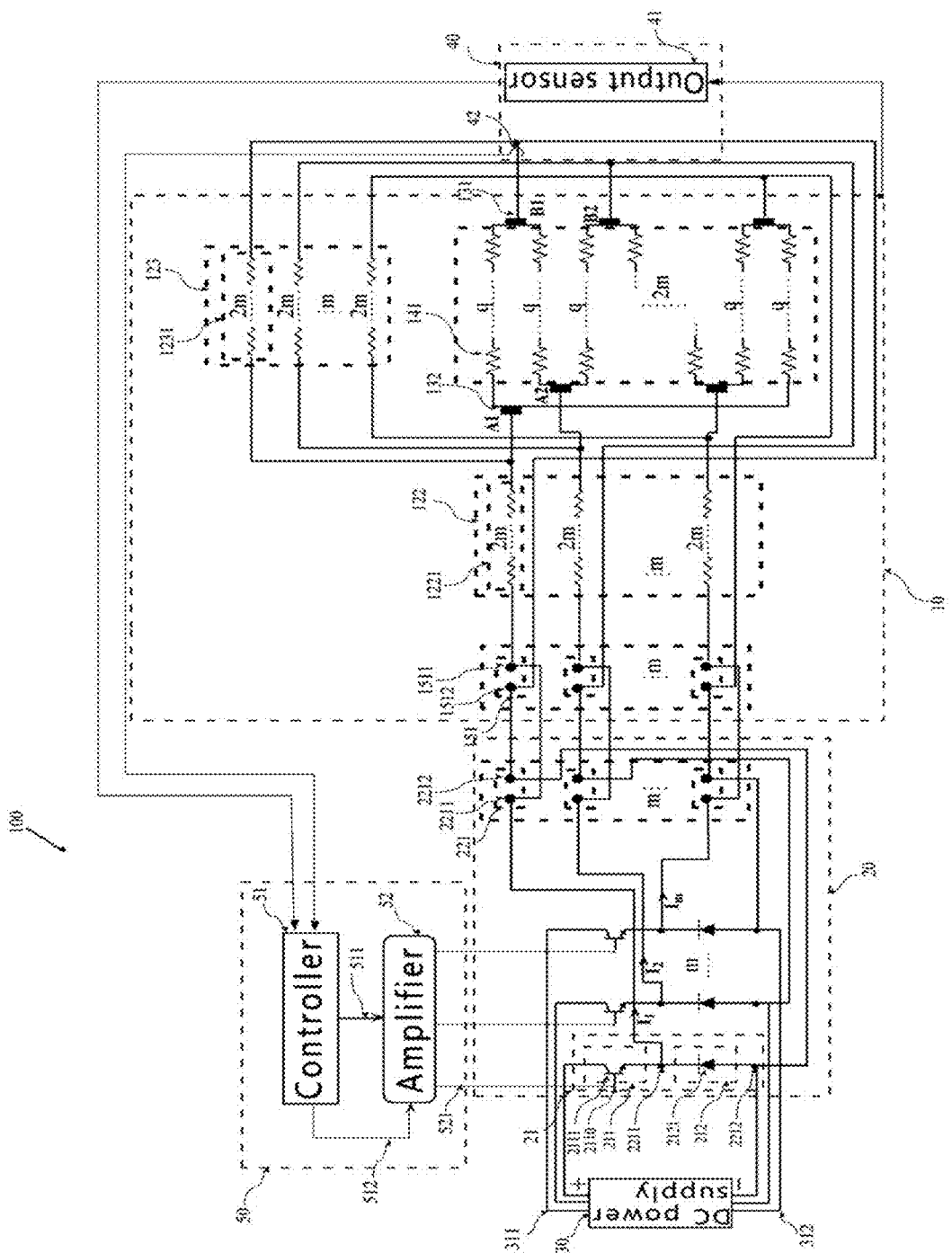
FIG. 1 is a schematic diagram of circuit connection of a shunt series wound DC motor driving device in embodiment one of the present invention.
Figure 2:
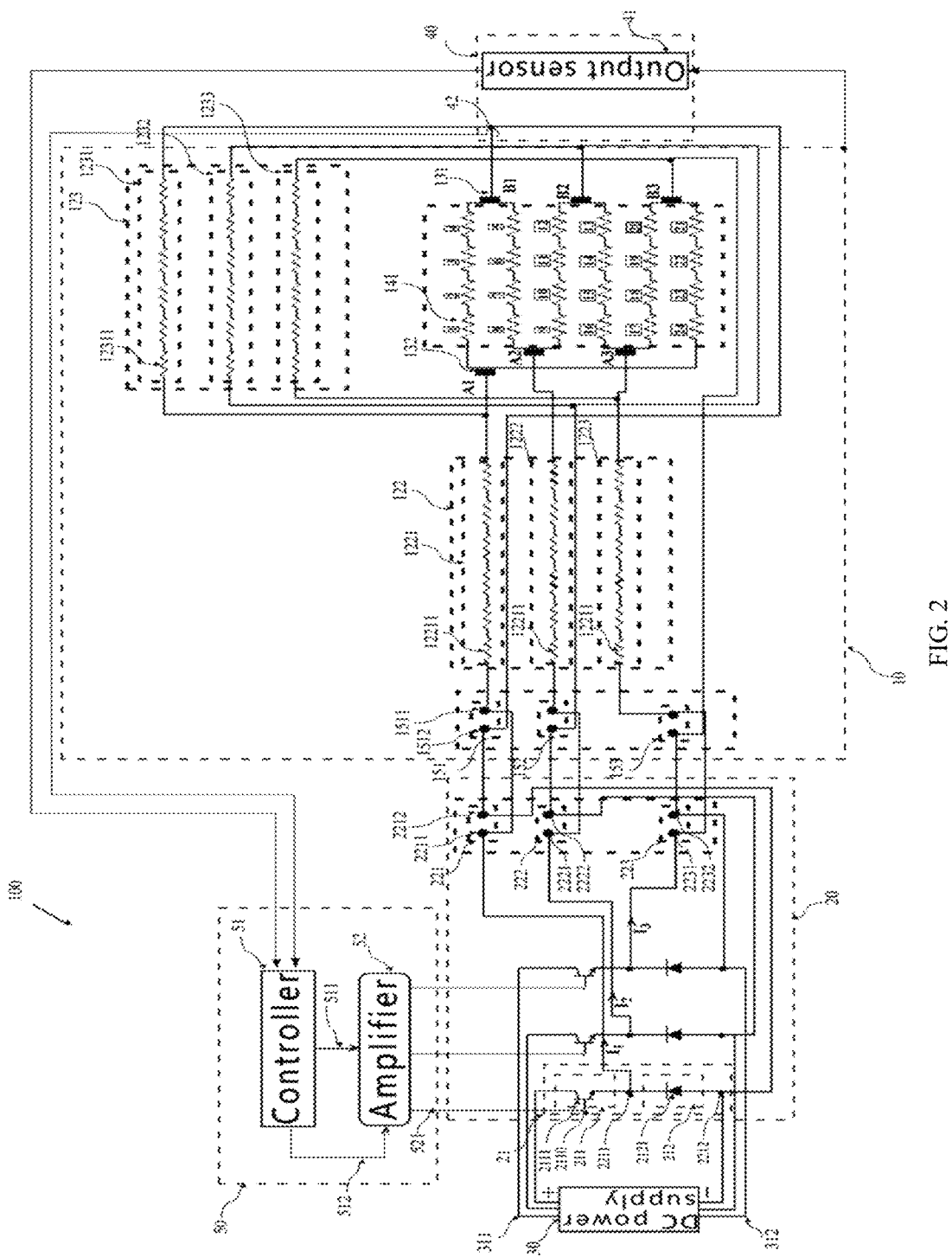
FIG. 2 is a schematic diagram of circuit connection of a shunt series wound DC motor driving device in embodiment one of the present invention when m is equal to 3.

As shown in FIGS. 1 and 2, a shunt series wound DC motor driving device 100 in the present embodiment one is arranged in electrical equipment such as a steel rolling machine, a electric locomotive, large-scale machine tool spindle drive system and a ship, and is used for driving the electrical equipment. The shunt series wound DC motor driving device 100 includes a shunt series wound DC motor 10, a chopper 20, a DC power supply 30, a sensing part 40 and a control part 50.

Figure 3:
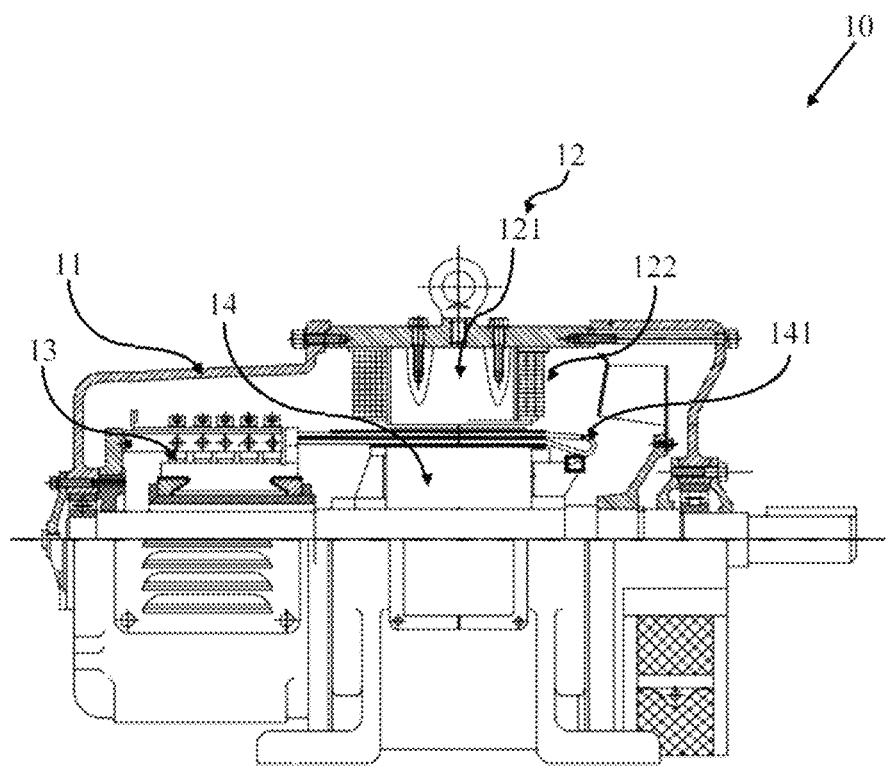
FIG. 3 is a schematic diagram of a longitudinal section of a shunt series wound DC motor in embodiment one of the present invention.
Figure 4:
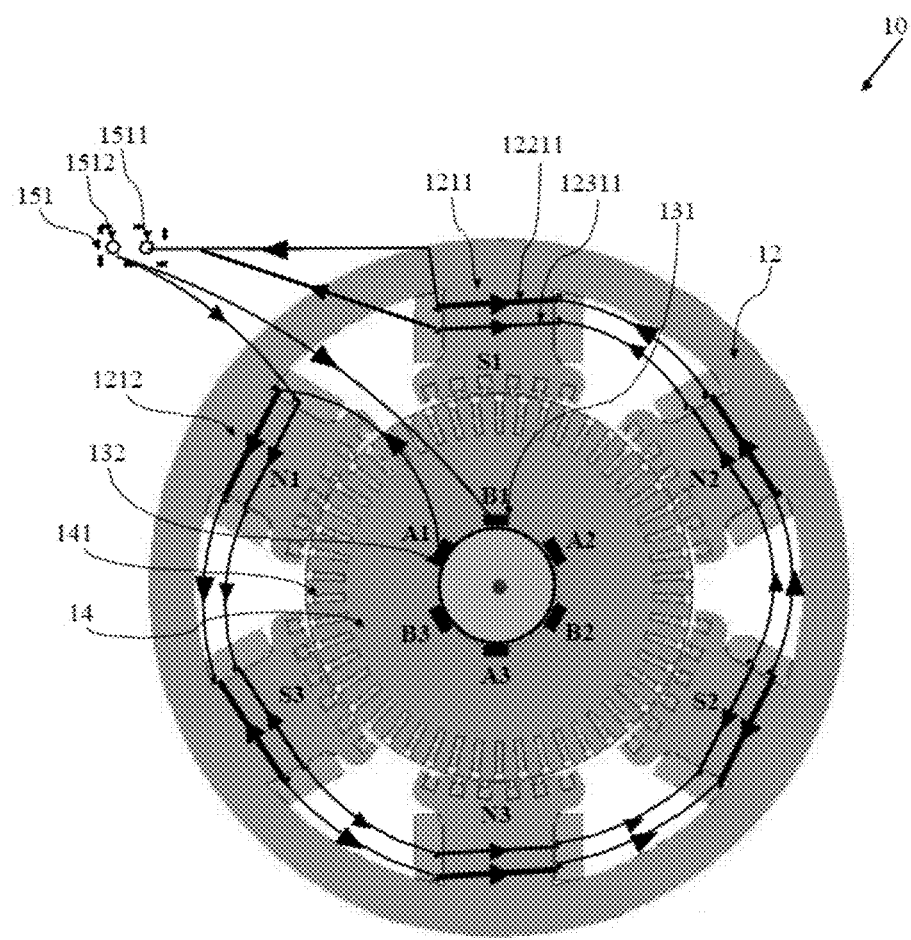
FIG. 4 is a schematic diagram of circuit connection of a transverse section of a shunt series wound DC motor in embodiment one of the present invention.

As shown in FIGS. 1-4, the shunt series wound DC motor 10 has a rated voltage and rated current, and includes a casing 11, a stator 12, electric brushes 13, a rotor 14 and a junction box (unshown in the drawing). As shown in FIG. 1, the number of pairs of the electric brushes 13 is set as m according to a value of the rated current, wherein m is an integer of being not less than 2. As shown in FIGS. 2 and 4, m is set as 3 in the present embodiment one.

As shown in FIGS. 1-4, the stator 12 is arranged in the casing 11, and includes m pairs of main poles 121 as well as a series exciting winding part and a shunt exciting winding part. In the present embodiment one, as shown in FIG. 4, the stator 12 includes 3 pairs of main poles 121, totaling 6 main poles.

Each of the main poles 121 includes 3 series exciting coils 12211 and 3 shunt exciting coils 12311. Each of the series exciting coils 12211 and each of the shunt exciting coils 12311 are formed by respectively winding insulated conductor strips composed of strip-shaped conductors coated with insulating layers on the main poles 121, wherein the insulated conductor strip is any one of enameled wire and insulated copper conducting bar. In the present embodiment 1, the insulated conductor strips are the enameled wires. In the present embodiment 1, the 3 exciting coils on each of the main poles 121 have the same winding direction and the same number of turns.

As shown in FIGS. 1-4, one series exciting coil 12211 is respectively extracted from each of the main poles 121; and totally 6 series exciting coils 12211 are connected into a series exciting winding unit 1221. A series exciting winding part 122 includes 3 series exciting winding units 1221. The insulated conductor strip in each of the series exciting winding units 1221 is provided with one series excitation end and the other series excitation end that are distinguished according to a preset current direction of the series exciting coils 12211.

One shunt exciting coil 12311 is respectively extracted from each of the main poles 121; and totally 6 shunt exciting coils 12311 are connected into a shunt exciting winding unit 1231. A shunt exciting winding part 123 includes 3 shunt exciting winding units 1231. The insulated conductor strip in each of the shunt exciting winding units 1231 is provided with one shunt excitation end and the other shunt excitation end that are distinguished according to a preset current direction of the shunt exciting coils.

Each pair of the main poles includes an S-polarity main pole 1211 and an N-polarity main pole 1212 that correspond to the winding directions of the series exciting coils 12211 and the preset current direction of the exciting coils. The 3 series exciting coils 12211 on each of the main poles have the same winding direction and the same number of turns; and the 3 shunt exciting coils 12311 have the same winding direction and the same number of turns.

In each of the series exciting winding units 1221, a connection relationship of the 6 series exciting coils 12211 is any one of series connection, parallel connection and series-parallel connection; and the 6 series exciting coils 12211 in each of the series exciting winding units 1221 have the same connection relationship. In the present embodiment one, the connection relationship of the 6 series exciting coils 12211 is the series connection.

In each of the shunt exciting winding units 1231, a connection relationship of the 6 shunt exciting coils 12311 is any one of series connection, parallel connection and series-parallel connection; and the 6 shunt exciting coils 12311 in each of the series exciting winding units 1231 have the same connection relationship. In the present embodiment one, the connection relationship of the 6 shunt exciting coils 12311 is the series connection.

As shown in FIGS. 1-4, the m pairs of electric brushes 13 are fixedly arranged in the casing 11. Each pair of the electric brushes 13 includes an S-pole corresponding electric brush 131 that corresponds to the S-polarity main pole 1211 and an N-pole corresponding electric brush 132 that corresponds to the N-polarity main pole 1212. In the present embodiment 1, as shown in FIGS. 2 and 4, the number of the electric brushes 13 is 3 pairs, totaling 6 electric brushes.

The electric brush 13 is any one of a narrow electric brush and a wide electric brush. The electric brush 13 in the present embodiment one is the narrow electric brush. Each of the electric brushes 13 includes an electric brush body or at least two electric brush bodies that are arranged along an axial direction of the motor and separately formed in electrical parallel connection. When each of the electric brushes 13 includes the at least two electric brush bodies, an actual contact area between each of the electric brushes and a commutator is increased, thereby improving commutation performance of the electric brushes. As shown in FIGS. 2-4, each of the electric brushes 13 in the present embodiment 1 includes one electric brush body.

As shown in FIG. 1, the m shunt excitation ends of the insulated conductor strips in all the shunt exciting winding units 1231 are electrically connected with m N-pole corresponding electric brushes 132 in all the electric brushes 13 to form m first electrical connection points; at the same time, the m other ends of the insulated conductor strips in all the shunt exciting winding units 1231 are electrically connected with m S-pole corresponding electric brushes 131 in all the electric brushes 13 to form m second electrical connection points. Certainly, according to needs, the m other shunt excitation ends of the insulated conductor strips in all the shunt exciting winding units 1231 are electrically connected with m N-pole corresponding electric brushes 132 in all the electric brushes 13 to form m first electrical connection points; at the same time, the m one ends of the insulated conductor strips in all the shunt exciting winding units 1231 are electrically connected with m S-pole corresponding electric brushes 131 in all the electric brushes 13 to form m second electrical connection points.

The m series excitation ends of the insulated conductor strips in all the series exciting winding units 1221 are respectively connected with the m first electrical connection points; at the same time, the m other series excitation ends of the insulated conductor bars in all the series exciting units 1221 form m first wiring terminals 1511; m second electrical connection points form m second wiring terminals 1512, m first wiring terminals 1511 are connected with m second wiring terminals 1512 respectively to form m pairs of external connection terminals, (i.e. wiring unit); m pairs of external connection terminals are connected with m pairs of power output terminals in a one-to-one correspondence. Certainly, according to needs, the m series excitation ends of insulated conductor bars in all the series field winding units 1221 are respectively connected with the m first electrical connection points; at the same time, the insulated conductors in all the series field winding units 1221 The m series-excited ends of the bar form m first wiring terminals 1511.

In the present embodiment one, as shown in FIGS. 2 and 4, the first wiring terminals 1511 and the second wiring terminals 1512 correspondingly form 1 pair of external wiring terminals 151; first wiring terminals 1521 and second wiring terminals 1522 correspondingly form 1 pair of external wiring terminals 152; first wiring terminals 1531 and second wiring terminals 1532 correspondingly form 1 pair of external wiring terminals 153. The three pairs of external connection terminals 151,152,153 are connected with three pairs of power output terminals in a one-to-one correspondence. Excitation effects of the 3 series exciting winding units 122 and 3 corresponding shunt exciting winding units 123 may be one of cumulative compound excitation and differential compound excitation. In the present embodiment 1, the excitation effect is the cumulative compound excitation; a magnetic field excited by the main poles is larger; and the torque of the motor is larger.

Figure 5:
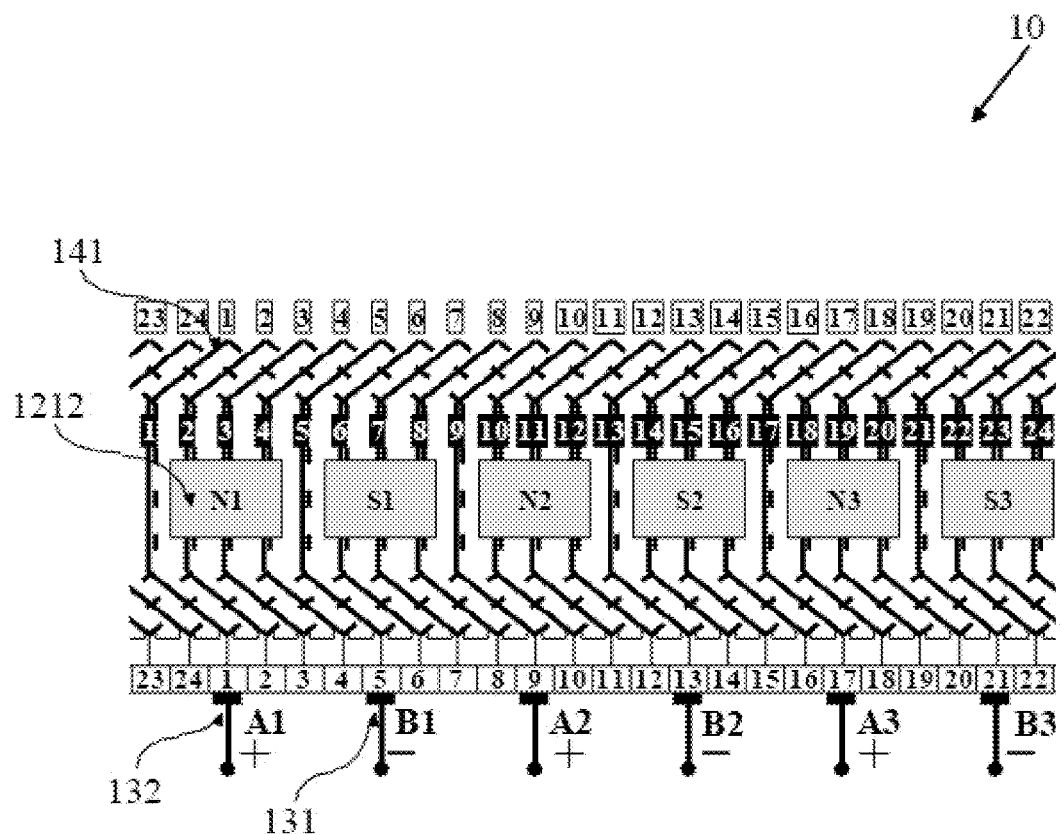
FIG. 5 is an unfolded schematic diagram of single lap connection of an armature winding of a shunt series wound DC motor in embodiment one of the present invention.
Figure 6:
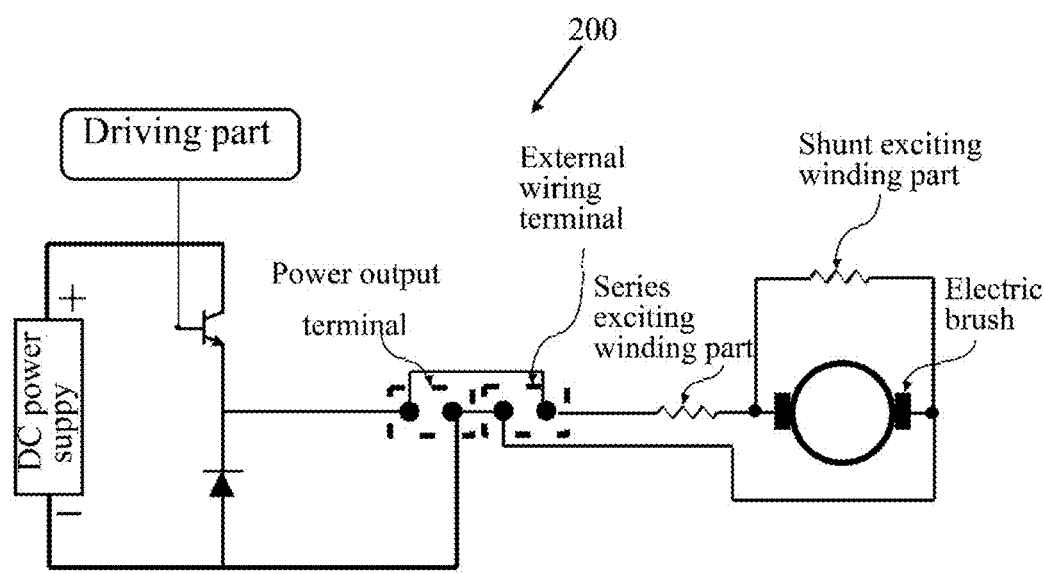
FIG. 6 is a schematic diagram of circuit connection of a traditional shunt series wound DC motor driving device.

As shown in FIGS. 1-4, the rotor 14 is arranged in the stator 12 and includes a plurality of armature windings 141 connected in a one-to-one correspondence manner in a preset connection manner, wherein the number of the armature windings 141 is 2m×q; and the preset connection manner is any one of single lap, multiplex lap and compound ripple. In the present embodiment 1, as shown in FIG. 5, the connection manner of the plurality of armature windings 141 is the single lap; two adjacent electric brushes 13 are connected to form an armature winding branch; and each armature winding branch includes q armature windings 141. In the first embodiment, as shown in FIG. 5, the multiple armature windings 141 are connected in a single stack, and two adjacent brushes 13 are connected to one armature winding branch, and each armature winding branch contains q Armature winding 141.

The junction box (unshown in the drawing) is fixed on the casing 11. As shown in FIGS. 2 and 4, the 3 pairs of external wiring terminals 151, 152 and 153 are arranged in the junction box.

As shown in FIG. 1, the chopper 20 converts a constant voltage of the DC power supply 30 into an average voltage controllable variable voltage based on a control signal transmitted by the control part 50, and provides the variable voltage for the shunt series wound DC motor 10. The chopper 20 includes m chopping units 21 that respectively correspond to the m pairs of electric brushes 13. In the present embodiment one, as shown in FIG. 2, the chopper 20 includes 3 chopping units 21.

Each of the chopping units 21 includes an upper bridge arm 211 and a lower bridge arm 212 connected with each other in series, and a first power output end 2211 and a second power output end 2212.

The upper bridge arm 211 includes a power switch tube 2111 and a switching control end 2110, and the lower bridge arm 212 includes a fly-wheel diode 2121. The power switch tube 2111 has a control pole, and the control pole forms a switch control end 2110.

When all the power switch tubes 2111 have the same maximum output current $I_1$, and the maximum current of the shunt series wound DC motor 10 is $I_{max}$, the m meets the following condition: $m > I_{max} \div I1$. The maximum output current is an important parameter of the power switch tube. The power switch tube may stably operate only at such a current value; and if the operating current exceeds the current value, the power switch tube may be broken down and then damaged due to overcurrent.

In the present embodiment one, all the power switch tubes are half-controlled or full-controlled devices. The half-controlled devices are ordinary thyristors; and the full-controlled devices are any one of power field effect transistors, gate-turn-off thyristors, integrated gate-commutated thyristors, insulated gate bipolar transistors and power bipolar transistors.

As shown in FIG. 1, the first power output end 2211 is arranged between the upper bridge arm 211 and the lower bridge arm 212; and the second power output end 2212 is arranged at the connection end of the lower bridge arm 211 and the DC power supply 30. The m first power output ends 2211 of all the chopping units 21 and the m second power output ends 2212 of all the chopping units 21 respectively correspondingly form m pairs of power output terminals 221; and the m pairs of power output terminals 221 are connected with the m pairs of external wiring terminals 151 in a one-to-one correspondence manner.

In the present embodiment one, shown in FIG. 2, the first power output end 2211 and the second power output end 2212 correspondingly form 1 pair of power output terminals 221; the first power output end 2221 and the second power output end 2222 correspondingly form 1 pair of power output terminals 222; the first power output end 2231 and the second power output end 2232 correspondingly form 1 pair of power output terminals 223; and the 3 pairs of power output terminals 221, 222 and 223 are connected with the 3 pairs of external wiring terminals 151, 152 and 153 in a one-to-one correspondence manner.

As shown in FIGS. 1 and 2, the DC power supply 30 has a constant voltage corresponding to the rated voltage of the shunt series DC motor 10, and has m pairs of power supply output terminals connected to m chopping units 21 in a one-to-one correspondence manner. Each pair of power output terminals includes a positive pole 311 and a negative pole 312; the positive pole 311 is connected with the upper bridge arm 211 in the corresponding chopping unit 21; and the negative pole 312 is connected with the lower bridge arm 212 in the corresponding chopping unit 21.

As shown in FIGS. 1 and 2, the control part 50 receives an external instruction signal that corresponds to a displacement, a rotation speed or a torque output by the shunt series wound DC motor 10.

The sensing part 40 is used for detecting a physical quantity of the shunt series wound DC motor 10 and outputting a feedback signal to the control part 50. The sensing part 40 includes an output sensor 41 and a current sensor 42.

The output sensor 41 detects the displacement, the rotation speed or the torque output by the shunt series wound DC motor 10 and outputs a corresponding output feedback signal to the control part 50.

The current sensor 42 detects line current values of electric brush outgoing lines in the shunt series wound DC motor 10 and outputs a corresponding current feedback signal to the control part 50.

The control unit 50 includes a controller 51 and an amplifier 52.

The controller 51 calculates, generates and outputs the control signal 511 and the enable signal 512 to the amplifier 52 according to the external command signal and the output feedback signal and the current feedback signal of the sensing unit 40. The control signal 511 includes m switching control signals corresponding to the m chopping units 21 and are formed according to a preset; and the enable signal 512 is used to control the working state of the amplifier 52.

The amplifier 52 enters the operating state under control of the enable signal 512, amplifies the m switching control signals and correspondingly provides the m switching control signals for the m switching control ends 2110. The amplifier 52 is provided with m amplified signal output ends 521 that respectively correspond to the m chopping units 21; and the m amplified signal output ends 521 are connected with the m switching control ends 2110 in a one-to-one correspondence manner.

In the present embodiment one, the preset stagger rule is as follows: phases of the m switching control signals are respectively staggered by 1/m switching cycle in sequence, so that peak values of ripple peaks of the superposed current ripples of the output current of the power output terminals of the m chopping units are decreased, thereby decreasing peak values of ripple peaks of the output torque and the rotation speed, further increasing the performance of the shunt series wound DC motor and prolonging service life of the motor. Certainly, according to the needs, when the m is an even number, the preset stagger rule is as follows: the phases of the m switching control signals are respectively staggered by 2/m switching cycle in sequence. Thus, the output current of the power output terminals of every two chopping units corresponding to every two pairs of the electric brushes with opposite spatial positions has the same current ripples, thereby producing a couple moment in the motor, avoiding a friction moment between a shaft and a bearing caused by the reason that the torque ripple output by the motor cannot form the couple moment, decreasing wear between the shaft and the bearing, increasing the performance of the motor and prolonging the service life of the motor.

In a stable state, the peak value of the current ripple peak is the difference of a maximum value and a minimum value; and a ripple factor is a percentage of the peak value to the mean. The peak value and the ripple factor are described below when the current ripple of the output current has the same frequency but the phases are staggered by ⅓ switching cycle in sequence and the switching frequency of the chopper 20 is 1 KHz.

Figure 7:
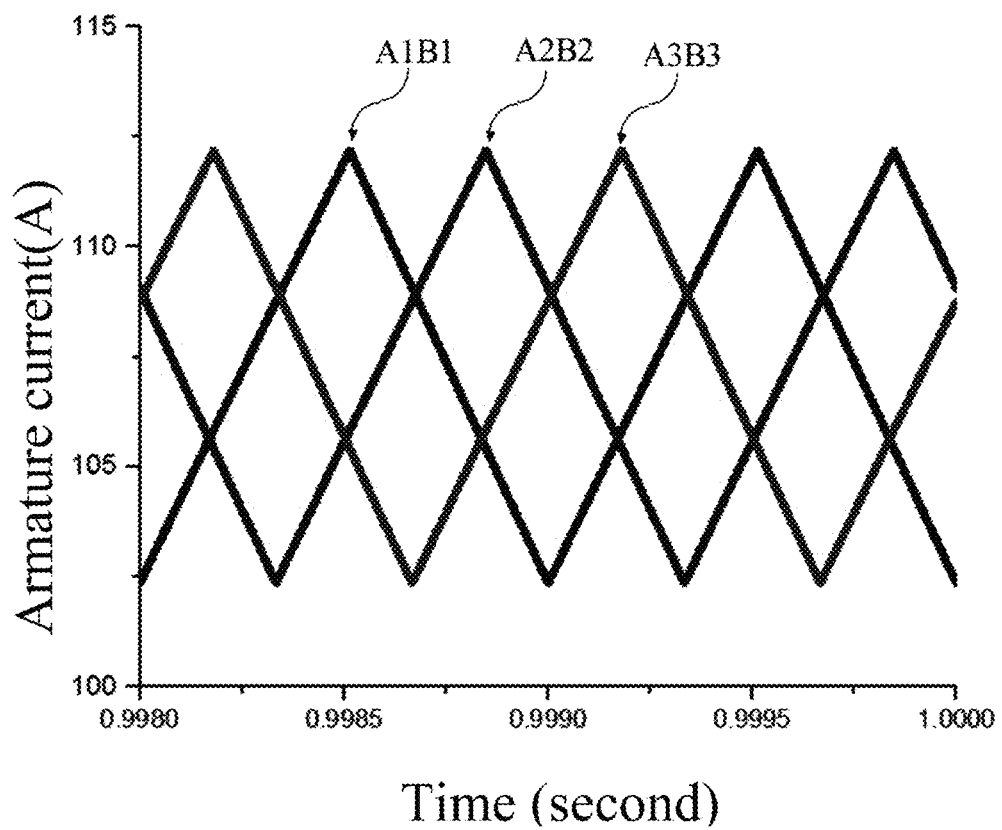
FIG. 7 is an input current waveform graph of three pairs of electric brushes of a shunt series wound DC motor in embodiment one of the present invention.

As shown in FIG. 7, the input current ripple of the three pairs of brushes A1B1, A2B2, and A3B3 of the shunt series wound DC motor in the present embodiment one is equal to 112.19−102.35=9.84 amperes; the average value is equal to 107.27 amperes; the ripple factor is equal to 9.84/107.27× 100%=9.17%.

Figure 8:
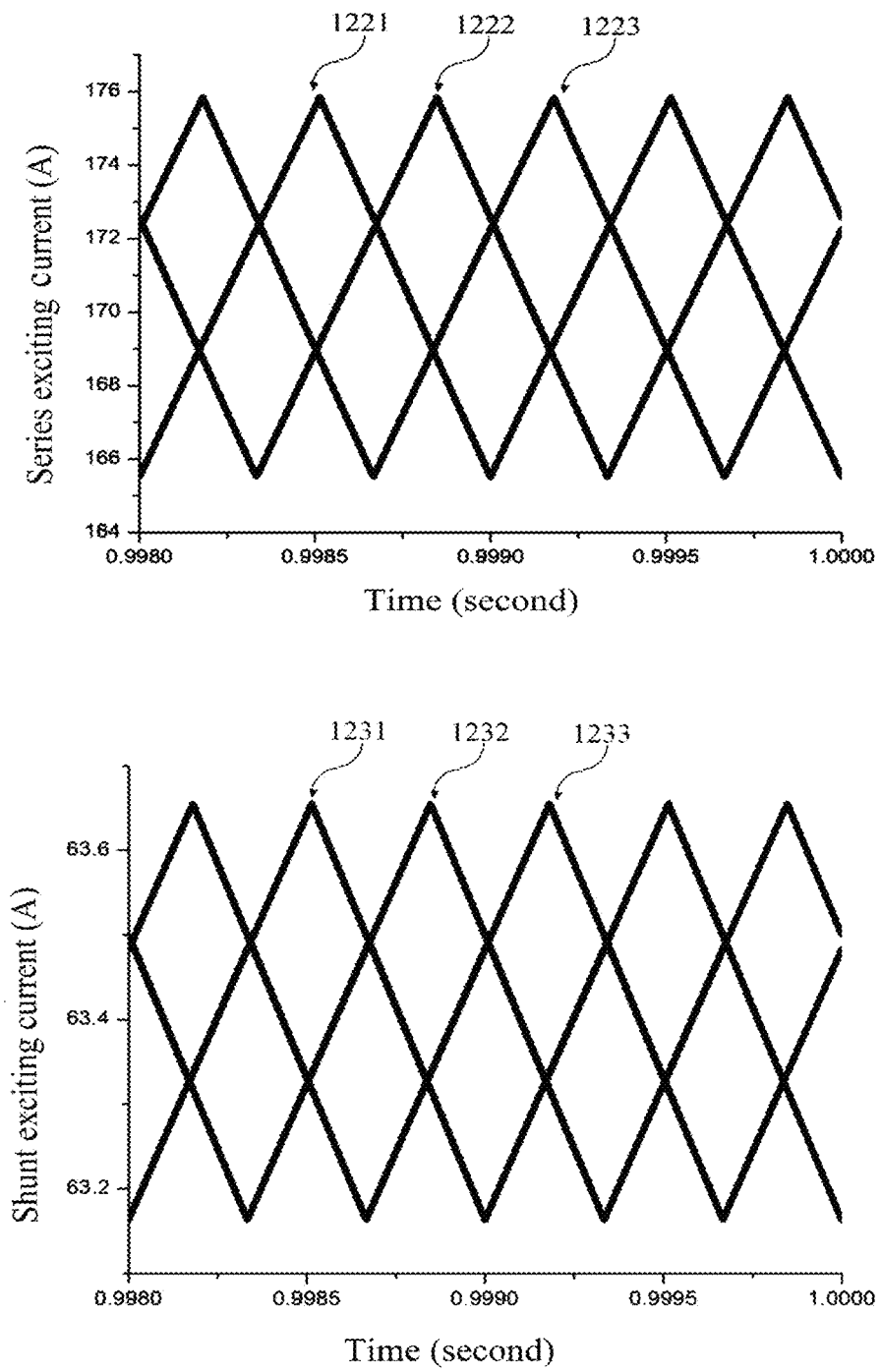
FIG. 8 is an input current waveform graph of three exciting winding units of a shunt series wound DC motor in embodiment one of the present invention.

As shown in FIG. 8, the current ripples of the three series exciting winding units 1221, 1222, and 1223 of the shunt series wound DC motor in the embodiment one is equal to 175.85−165.51=10.34 amperes; the average value is equal to 170.68 amperes; and the ripple factor is equal to 10.34/ 170.68×100%=6.06%. The current ripple of the three shunt exciting winding units 1231, 1232 and 1233 is equal to 63.66−63.16=0.49 amperes; the average value is equal to 63.41 amperes; and the ripple factor is equal to 0.49/63.41× 100%=0.78%.

Figure 9:
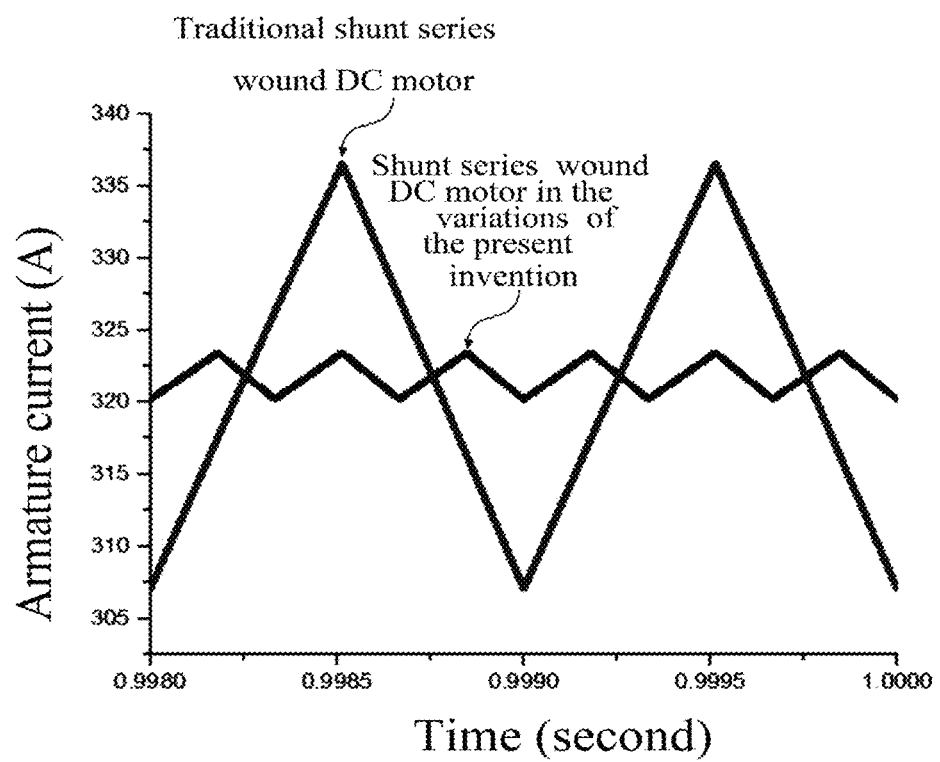
FIG. 9 is a comparison diagram of armature current of a shunt series wound DC motor in embodiment one of the present invention and armature current of a traditional shunt series wound DC motor.

As shown in FIG. 9, in the stable state, the armature current of the shunt series wound DC motor in the present embodiment one is equal to the sum of the current of the three pairs of brushes A1B1, A2B2, and A3B3; and the armature current ripple is equal to 323.45−320.18=3.26 amperes; the average value is equal to 321.82 amperes; and the ripple factor is equal to 3.26/321.82×100%=1.01%. The armature current ripple of the traditional shunt series wound DC motor is equal to 336.58−307.04=29.55 amperes; the average value is equal to 321.82 amperes; and the ripple factor is equal to 29.55/321.82×100%=9.18%. Although the shunt series wound DC motor in the present embodiment one and the traditional shunt series wound DC motor have the same mean of the armature current, the armature current ripple and the ripple factor of the shunt series wound DC motor in the present embodiment one are only one ninth of the traditional shunt series wound DC motor.

Figure 10:
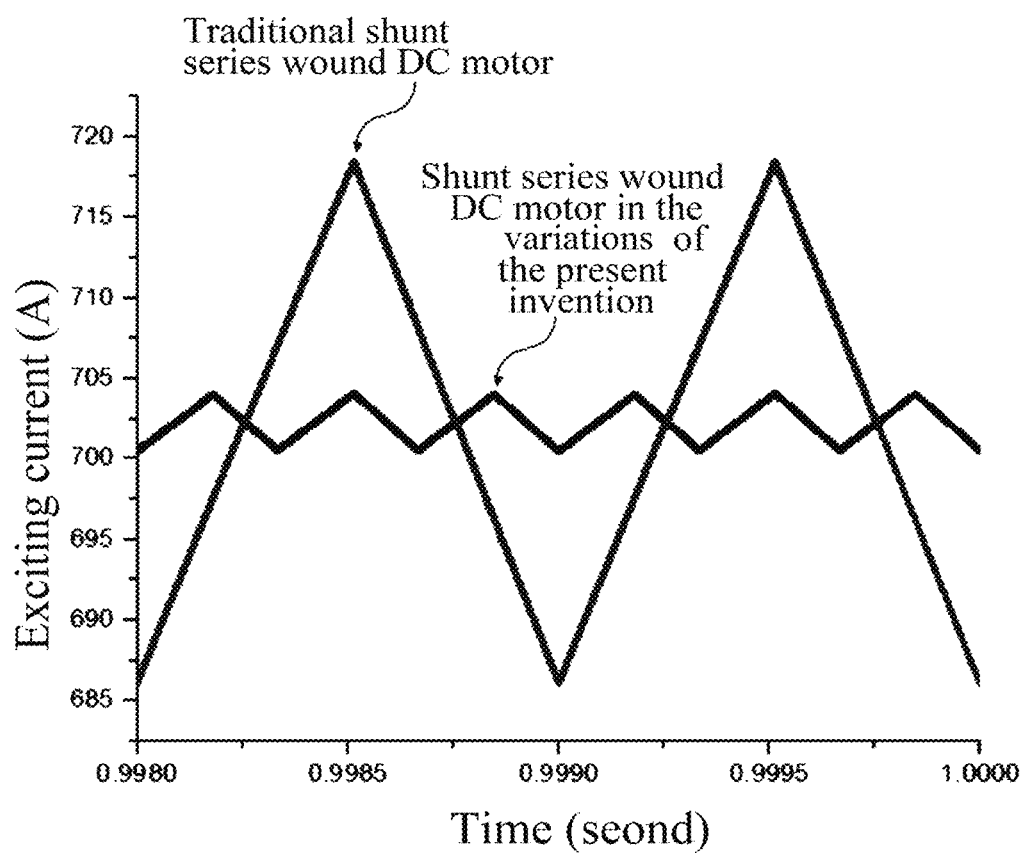
FIG. 10 is a comparison diagram of exciting current of a shunt series wound DC motor in embodiment one of the present invention and exciting current of a traditional shunt series wound DC motor.

As shown in FIG. 10, in a stable state, the exciting current of the shunt series wound DC motor in the present embodiment one is equal to the sum of the current of the three series exciting winding units 1221, 1222, and 1223 and the three shunt exciting winding units 1231, 1232, and 1233; the ripple of the exciting current is 704.06−700.48=3.59 amperes; the average value is equal to 702.27 amperes; and the ripple factor is equal to 3.59/702.27×100%=0.51%. The armature current ripple of the traditional shunt series direct current motor is equal to 718.51−686.01=32.50 amperes; the average value is equal to 702.27 amperes; and the ripple factor is equal to 32.50/702.27×100%=4.63%. Although the shunt series wound DC motor in the present embodiment one and the traditional shunt series wound DC motor have the same mean of the exciting current, the exciting current ripple and the ripple factor of the shunt series wound DC motor in the present embodiment one are only one ninth of the traditional shunt series wound DC motor.

It is known that the electromagnetic torque and motion equation of a shunt series wound DC motor are as follows:

$$\begin{cases} T_{em} = C_T \Phi I_a = L_{af} I_f I_a & (1) \\ T_{em} - T_{load} = J \dfrac{d}{dt} \Omega & (2) \end{cases}$$

In the equations, $T_{em}$ is an electromagnetic torque; $C_T$ is a torque constant; $\Phi$ is flux of a main magnetic field; $L_{af}$ is mutual inductance of the exciting winding part and the armature winding and is a constant; $I_f$ is the exciting current; $I_a$ is the armature current; $T_{load}$ is a load torque; J is a rotational inertia of the load and is a constant; and $\Omega$ is angular output velocity.

In the present embodiment one, the input current of the shunt series wound DC motor is equal to the sum of the armature current and the shunt exciting current and is also equal to the series exciting current; the rated input current of the shunt series wound DC motor is the maximum input current of the motor in a rated operating state.

In the equation (1), the electromagnetic torque $T_{em}$ is in direct proportion to a product of the armature current $I_a$ and the flux $\Phi$ of the main magnetic field; and the main magnetic field of the DC motor is excited by the exciting winding part powered by the chopper. It can be seen from the equation (1) that, the electromagnetic torque $T_{em}$ is in direct proportion to the product of the armature current $I_a$ and the exciting current $I_f$ and according to the ripple factor of the exciting current $I_f$ and the ripple factor of the armature current $I_a$, the electromagnetic torque $T_{em}$ produces a larger ripple factor; the angular output velocity $\Omega$ has larger pulsation or ripple; and the performances of the driving device and the electrical equipment are poorer.

Figure 11:
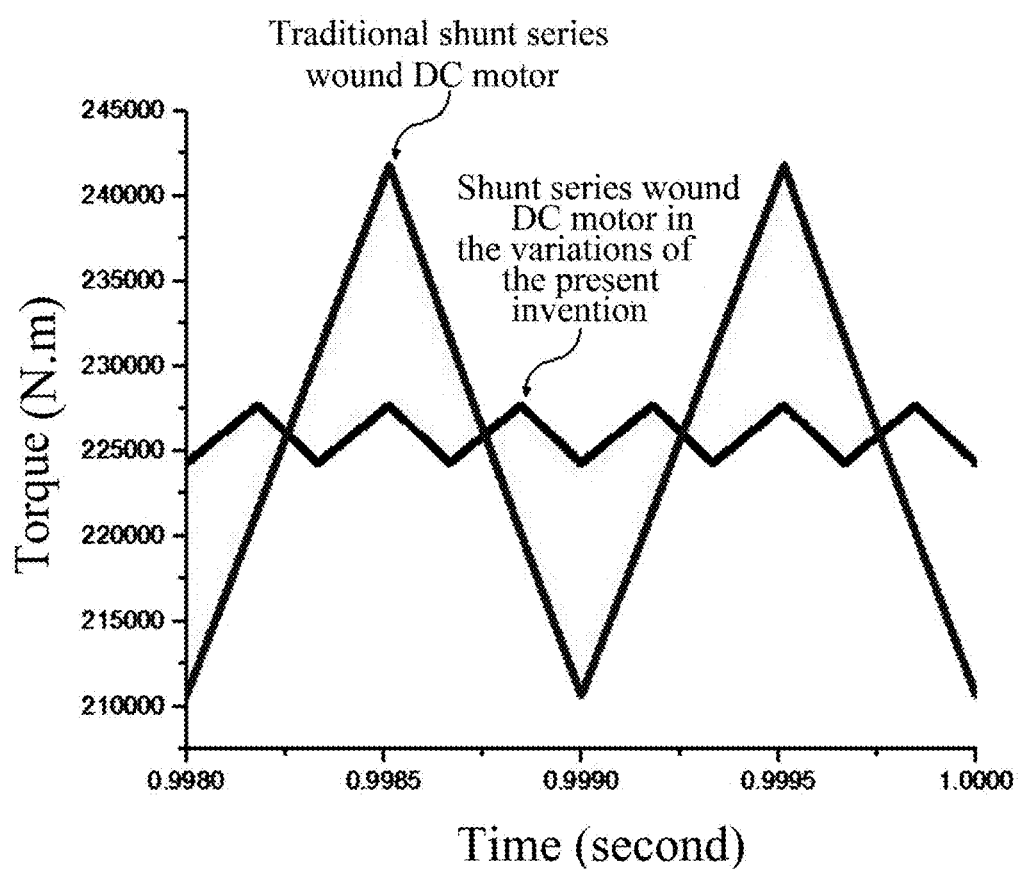
FIG. 11 is a comparison diagram of a torque of a shunt series wound DC motor in embodiment one of the present invention and a torque of a traditional shunt series wound DC motor.

In the present embodiment one, $L_{af}$ is equal to 1. In the stable state, as shown in FIG. 11, the torque ripple of the shunt series wound DC motor in the present embodiment one is equal to 227725.80−224281.17=3444.63 Nm; the average value is equal to 226003.19 Nm; and the ripple factor is equal to 3444.63/226003.19=1.52%. The torque ripple of the traditional shunt series wound DC motor is equal to 241839.18−210630.99=31208.19N·m; the average value is equal to 226082.27N·m; and the ripple factor is equal to 13.80%.

Figure 12:
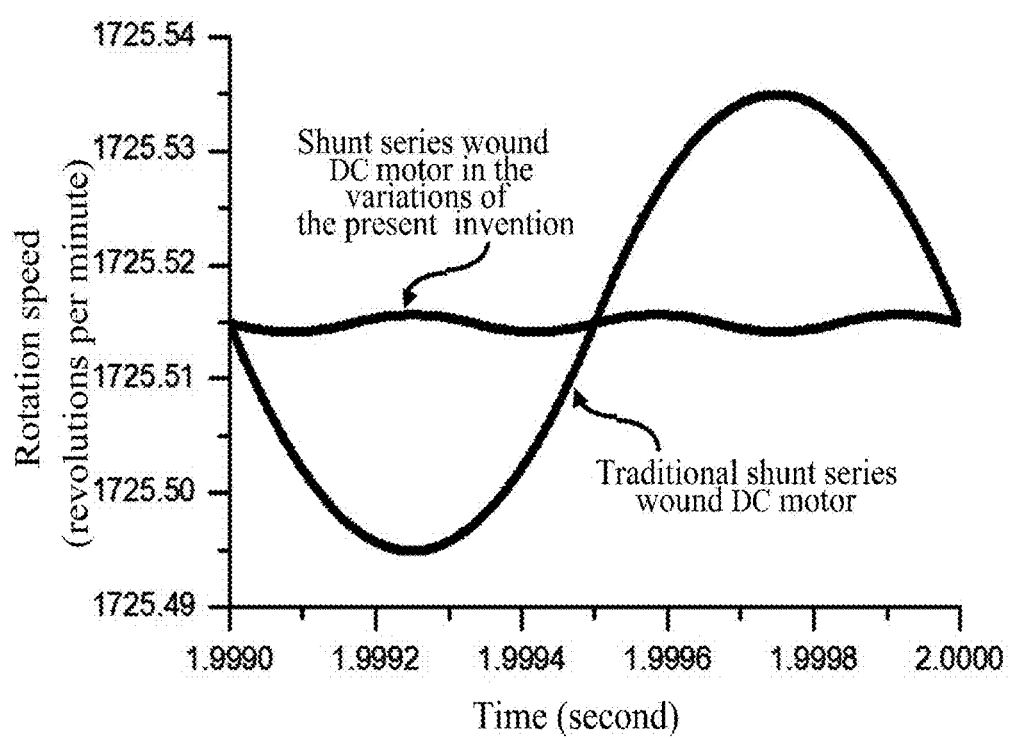
FIG. 12 is a comparison diagram of a rotation speed of a shunt series wound DC motor in embodiment one of the present invention and a rotation speed of a traditional shunt series wound DC motor.

As shown in FIG. 12, in the stable state, the peak value of the rotation speed ripple of the shunt series wound DC motor 10 in the embodiment one is equal to 1725.5157−1725.5142=0.0015 revolutions per minute; and the average value is equal to 1725.515 revolutions per minute; the ripple factor is equal to 0.000087%. The peak value of the rotation speed ripple of the traditional shunt series wound DC motor is equal to 1725.535−1725.4949=0.0401 revolutions per minute; the average value is equal to 1725.515 revolutions per minute; and the ripple factor is equal to 0.002324%. Although the shunt series wound DC motor 10 in the present embodiment one and the traditional shunt series wound DC motor 10 have the same rotational speed average value, the peak value of the rotation speed ripple peak and ripple factor of shunt series wound DC motor 10 in the present embodiment one to those in the traditional shunt series wound DC motor is 1/26.7.

In other words, although the shunt series wound DC motor 10 in the present embodiment 1 has basically the same mean of the torque as the traditional shunt series wound DC motor, the peak value of the torque ripple peak and the ripple factor of the shunt series wound DC motor 10 in the present embodiment one are only one ninth of the traditional shunt series wound DC motor, thereby decreasing the peak value of the output torque ripple peak and the ripple factor of the motor and further decreasing the peak value of the output rotation speed ripple and the ripple factor of the motor. The rotation speed ripple factor of the shunt series wound DC motor 10 in the present embodiment 1 is only 1/26 that of the traditional shunt series wound DC motor. Finally, purposes of decreasing electromagnetic interference, vibration and noise of the motor and increasing the performances of the shunt series wound DC motor and the driving device are achieved.

Embodiment Two

In the present embodiment two, with respect to the same structure as the embodiment two, and the same descriptions are omitted.

Figure 13:
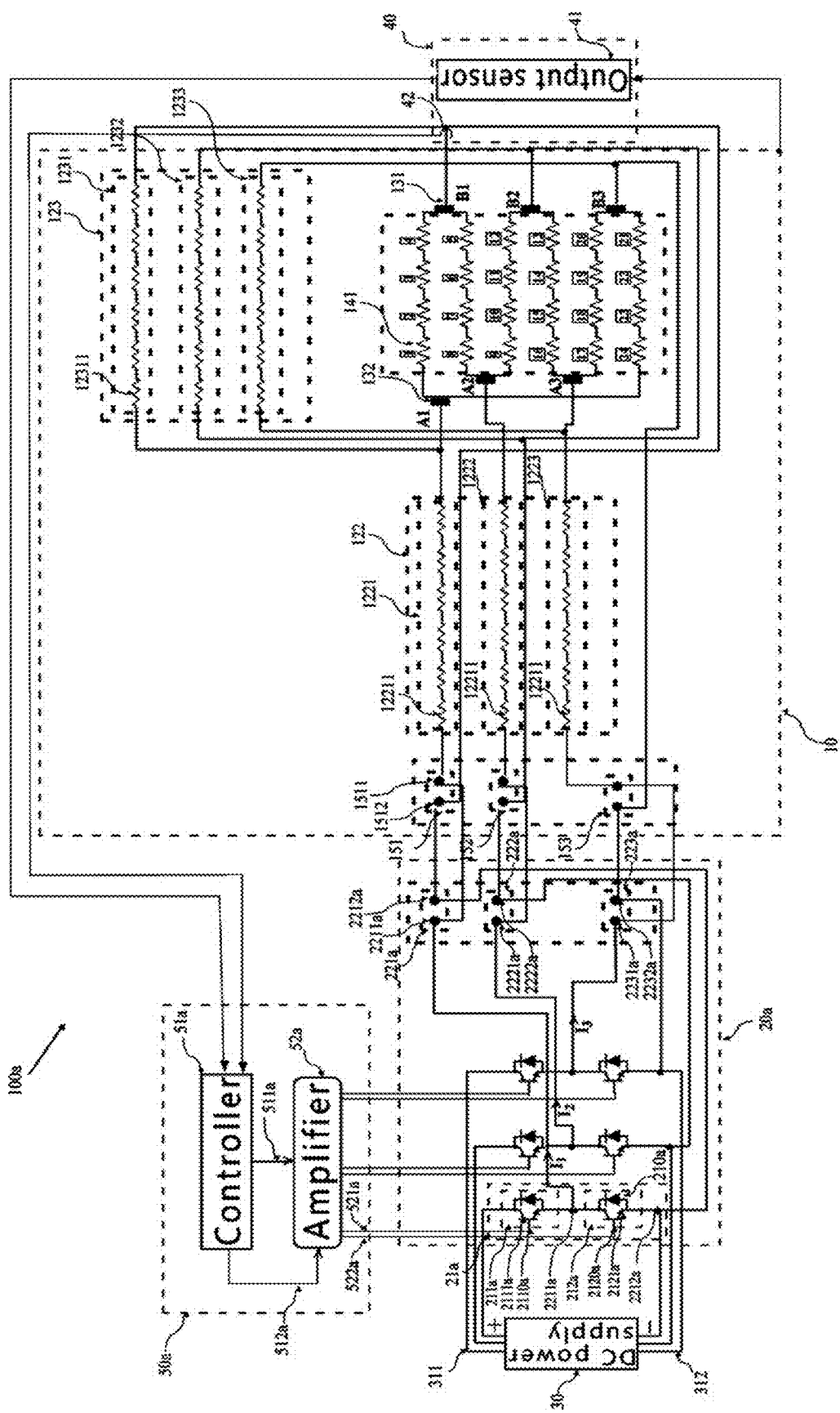
FIG. 13 is a schematic diagram of circuit connection of a shunt series wound DC motor driving device in embodiment two of the present invention when m is equal to 3.

As shown in FIG. 13, a shunt series wound DC motor driving device 100a includes a shunt series wound DC motor 10, a chopper 20a, a DC power supply 30, a sensing part 40 and a control part 50a.

The chopper 20a includes 3 chopping units 21a; and each of the chopping units 21a includes an upper bridge arm 211a and a lower bridge arm 212a connected with each other in series, and a first power output end 2211a and a second power output end 2212a.

Each upper bridge arm 211a includes 1 power switch tube 2111a, a diode 210a in reverse parallel connection with the power switch tube 2111a, and an upper bridge arm switching control end 2110a; and each lower bridge arm 212a includes 1 power switch tube 2121a, a diode 210a in reverse parallel connection with the power switch tube 2111a, and a lower bridge arm switching control end 2120a.

The first power output end 2211a is arranged between the upper bridge arm 211a and the lower bridge arm 212a; and the second power output end 2212a is arranged at the connection end of the lower bridge arm 212a and the DC power supply 30. The first power output end 2211a and the second power output end 2212a correspondingly form 1 pair of power output terminals 221a; the first power output end 2221a and the second power output end 2222a correspondingly form 1 pair of power output terminals 222a; the first power output end 2231a and the second power output end 2232a correspondingly form 1 pair of power output terminals 223a; and the 3 pairs of power output terminals 221a, 222a and 223a are connected with the 3 pairs of external wiring terminal 151, 152 and 153 of the motor in a one-to-one correspondence manner.

The control part unit 50a includes a controller 51a and an amplifier 52a.

The controller 51a outputs a control signal 511a and an enable signal 512a to the amplifier 52a. The control signal 511a includes three unit control signals corresponding to the three chopping units 21a and are formed according to a preset; each of the unit control signals includes two switch control ends 2110a and 2120a in the corresponding chopper unit 21a; and the enable signal 512a is used to control the working state of the amplifier 52a.

The amplifier 52a enters the operating state under control of the enable signal 512a, amplifies the two switching control signals in each of the unit control signals and provides the two switching control signals for the two switching control ends 2110a and 2120a. The amplifier 52a is provided with 3 amplified signal output parts that correspond to the 3 chopping units 21a. Each of the amplified signal output parts is composed of two amplified signal output ends 521a and 522a. The two amplified signal output ends 521a and 522a of each of the amplified signal output parts are respectively correspondingly connected with the two switching control ends 2110a and 2120a in the corresponding chopping units 21a, i.e., the amplified signal output end 521a is connected with the upper bridge arm switching control end 2110a; and the amplified signal output end 522a is connected with the lower bridge arm switching control end 2120a.

In the present embodiment two, the preset phase stagger rule is as follows: the m phases corresponding to the m unit control signals are used as the m preset phases and are sequentially staggered by 1/m switching cycle in sequence. In each of the chopping units, the switching control signal that corresponds to the upper bridge arm switching control end is set as a reference switching control signal; and a phase of the reference switching control signal is set according to the preset phase that corresponds to the unit control signal. The switching control signal that corresponds to the lower bridge arm switching control end is set reciprocal to the reference switching control signal, so that peak values of ripple peaks of the superposed current ripples of the output current of the power output terminals of the m chopping units are decreased, thereby decreasing peak values of ripple peaks of the output torque and the rotation speed, further increasing the performance of the shunt series wound DC motor and prolonging service life of the motor. Certainly, according to the needs, when the m is the even number, the preset stagger rule is as follows: the m phases that respectively correspond to the m unit control signals serve as the m preset phases and are staggered by 2/m switching cycle in sequence. Thus, the output current of the power output terminals of every two chopping units corresponding to every two pairs of the electric brushes with opposite spatial positions has the same current ripples, thereby producing a couple moment in the motor, avoiding a friction moment between a shaft and a bearing caused by the reason that the torque ripple output by the motor cannot form the couple moment, decreasing wear between the shaft and the bearing, increasing the performance of the motor and prolonging the service life of the motor.

The shunt series wound DC motor in the present embodiment two can work in the state as shown in FIG. 7-12, and has the same effect as the embodiment one; and, the upper bridge arm and the lower bridge arm respectively include at least one power switch tube, and at least one diode in reverse parallel connection with the power switch tube; the shunt series wound DC motor can further work in the generator state to feed energy back to the power supply during retarding brake, so as to improve the performance of the system Embodiment Three In the present embodiment three, with respect to the same structure as the embodiment one, the same symbol is given, and the same description is omitted.

Figure 14:
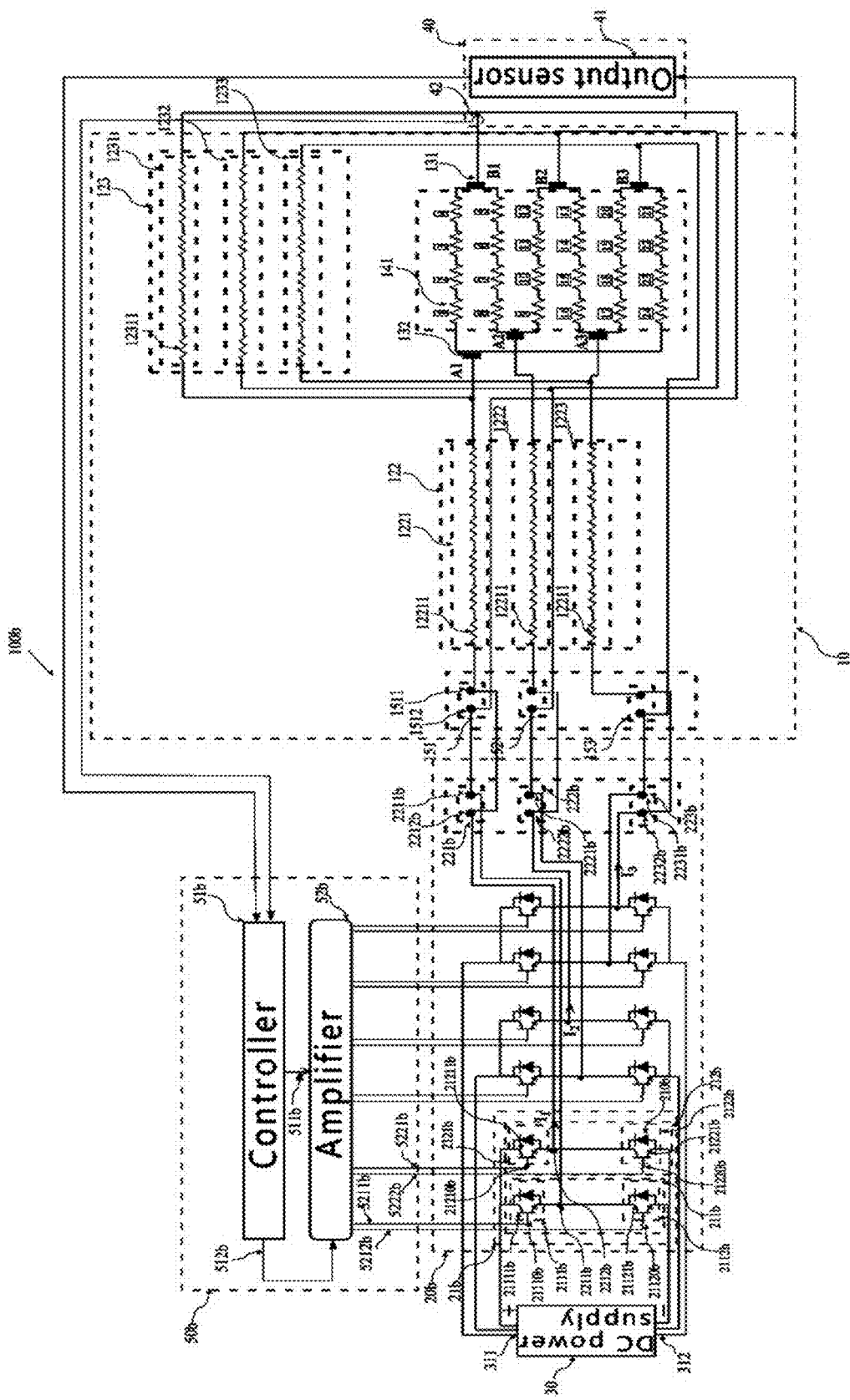
FIG. 14 is a schematic diagram of circuit connection of a shunt series wound DC motor driving device in embodiment three of the present invention when m is equal to 3.

As shown in FIG. 14, a shunt series wound DC motor driving device 100b includes a shunt series wound DC motor 10, a chopper 20b, a DC power supply 30, a sensing part 40 and a control part 50b.

The chopper 20b includes 3 chopping units 21b. Each of the chopping units 21b includes a first upper bridge arm 211b and a second bridge arm 212b, and a first power output end 2211b and a second power output end 2212b. The first upper bridge arm 211b includes a first upper bridge arm 2111b and a first lower bridge arm 2112b in series connection with each other; the second bridge arm 212b includes a second upper bridge arm 2121b and a second lower bridge arm 2122b in series connection with each other; and the first upper bridge arm 211b and the second bridge arm 212b are connected in parallel with each other. The first upper bridge arm 2111b includes one power switch tube 21111b, a diode 210b in reverse parallel connection with the power switch tube, and a switching control end 21110b; the first lower bridge arm 2112b includes one power switch tube 21121b, a diode 210b in reverse parallel connection with the power switch tube, and a switching control end 21120b; the second upper bridge arm 2121b includes one power switch tube 21211b, a diode 210b in reverse parallel connection with the power switch tube, and a switching control end 21210b; and the second lower bridge arm 2122b includes one power switch tube 21221b, a diode 210b in reverse parallel connection with the power switch tube, and a switching control end 21220b.

The first power output end 2211b is arranged between the first upper bridge arm 2111b and the first lower bridge arm 2112b; and, the second power output end 2212b is arranged between the second upper bridge arm 2121b and the second lower bridge arm 2122b. The first power output end 2211b corresponds to the second power output end 2212b to form a pair of power output terminals 221b; the first power output end 2221b corresponds to the second power output end 2222b to form a pair of power output terminals 222b; the first power output end 2231b corresponds to the second power output end 2232b to form a pair of power output terminals 223b; and the three pairs of power output terminals 221b, 222b, and 223b are connected with the three pairs of external wiring terminals 151, 152, and 153 in a one-to-one correspondence manner.

The positive pole 311 of the DC power supply 30 is connected with the first upper bridge arm 2111b and the second upper bridge arm 2121b in the corresponding chopping unit 21b; and a negative pole of the DC power supply is connected with the first lower bridge arm 2112b and the second lower bridge arm 2122b in the corresponding chopping unit 21b.

The control part 50b includes a controller 51b and an amplifier 52b. The controller 51b outputs a control signal 511b and an enable signal 512b to the amplifier 52b. The control signal 511b includes three unit control signals that respectively correspond to the three chopping units 21b and are formed according to a preset phase stagger rule; each of the unit control signals includes four switching control signals that correspond to four switching control ends such as 21110b, 21120b, 21210b and 21220b in the corresponding chopping units 21b; and the enable signal 512b is used for controlling an operating state of the amplifier 52b.

The amplifier 52b enters the working state under the control of the enable signal 512b, amplifies the four switching control signals in each of the unit control signals and provides the four switching control signals for the four switch control ends 21110b, 21120b, 21210b, and 21220b. The amplifier 52b is provided with 3 amplified signal output parts that correspond to the 3 chopping units 21b; and each of the amplified signal output parts is composed of four amplified signal output ends 5211b, 5212b, 5221b, and 5222b. The four amplified signal output ends of each of the amplified signal output parts are respectively correspondingly connected with the four switching control ends such as 21110b, 21120b, 21210b and 21220b in the corresponding chopping units 21b, i.e., the amplified signal output end 5211b is connected with a first upper bridge arm switching control end 21110b; the amplified signal output end 5212b is connected with a first lower bridge arm switching control end 21120b; the amplified signal output end 5221b is connected with a second upper bridge arm switching control end 21210b; and the amplified signal output end 5222b is connected with a second lower bridge arm switching control end 21220b.

In the present embodiment three, the preset phase stagger rule is as follows: the m phases that respectively correspond to the m unit control signals serve as m preset phases and are staggered by 1/m switching cycle in sequence. In each of the chopping units, the two switching control signals that correspond to the first upper bridge arm switching control end and the second lower bridge arm switching control end are set as reference switching control signals; and phases of the reference switching control signals are set according to the preset phase that corresponds to the unit control signal. The two switching control signals that correspond to the first lower bridge arm switching control end and the second upper bridge arm switching control end are set reciprocal to the reference switching control signals, so that peak values of ripple peaks of the superposed current ripples of the output current of the power output terminals of the m chopping units are decreased, thereby decreasing peak values of ripple peaks of the output torque and the rotation speed, further increasing the performance of the shunt series wound DC motor and prolonging service life of the motor. Certainly, according to the needs, when the m is the even number, the preset stagger rule is as follows: the m phases that respectively correspond to the m unit control signals serve as the m preset phases and are staggered by 2/m switching cycle in sequence. Thus, the output current of the power output terminals of every two chopping units corresponding to every two pairs of the electric brushes with opposite spatial positions has the same current ripples, thereby producing a couple moment in the motor, avoiding a friction moment between a shaft and a bearing caused by the reason that the torque ripple output by the motor cannot form the couple moment, decreasing wear between the shaft and the bearing, increasing the performance of the motor and prolonging the service life of the motor.

The shunt series wound DC motor in the present embodiment three can work in the state shown in FIG. 7-12, and has the same effect as the embodiment one; moreover, the first upper bridge arm, the first lower bridge arm, and the second upper bridge arm and the second lower bridge arm respectively include at least one power switch tube and at least one diode connected in reverse parallel connection with the power switch tube; therefore, the shunt series wound DC motor can further work in four quadrants and is flexible to be controlled.

Actions and Effects of the Embodiments

According to the shunt series wound DC motor driving device and the electric equipment including the shunt series wound DC motor driving device according to the embodiments one to three, the chopper is provided with the m chopping units; and each chopping unit is provided with the first power output end, the second power output end and w switching control ends; the control signal includes m unit control signals that respectively correspond to the m chopping units and are formed according to a preset phase stagger rule; each of unit control signals includes w switching control signals corresponding to the w switch control ends in the chopping units; the w switching control ends are used to correspondingly receive the w switching control signals; and m first power output ends of all the chopping units and m second power output ends of all the chopping units respectively correspondingly form m pairs of power output terminals. The shunt series wound DC motor includes: m pairs of brushes; the stator, including m pairs of main poles corresponding to the m pairs of brushes and including a series exciting winding part and a shunt exciting winding part; and a rotor, which is arranged in the stator, includes a plurality of armature windings connected to each other by a predetermined connection method. Each pair of main poles includes an S-polarity main pole and a N-polarity main pole; the polarities of two adjacent main poles are different; the positions of two electric brushes in each pair of electric brushes are adjacent; and each pair of electric brushes includes an S-pole corresponding electric brush that corresponds to the S-polarity main pole and an N-pole corresponding electric brush that corresponds to the N-polarity main pole. The series exciting winding part includes m series exciting winding units; and the shunt exciting winding part includes m shunt exciting winding units. Each of the series exciting winding units is formed by respectively making series exciting coils from insulated conductor strips composed of metal wires coated with insulating layers on at least one pair of corresponding main poles. Each of the shunt exciting winding units is formed by respectively making shunt exciting coils from insulated conductor strips composed of metal wires coated with insulating layers on at least one pair of corresponding main poles. The insulated conductor strip in each of the series exciting winding units is provided with one series excitation end and the other series excitation end; and the insulated conductor strip in each of the shunt exciting winding units is provided with one shunt excitation end and the other shunt excitation end. The m shunt excitation ends of the insulated conductor bars in all shunt excitation winding units are electrically connected with the m S-pole corresponding electric brushes in all the electric brushes to form m first electrical connection point; at the same time, the m other ends of the insulated conductor bars in all the shunt excitation winding units are electrically connected to the m N-pole corresponding electric brushes in all the electric brushes to form m second electrical connection points; or, m other shunt excitation ends of the insulated conductor bars in all shunt exciting winding units are electrically connected with m S-pole corresponding electric brushes in all the electric brushes to form m first electrical connection points correspondingly; at the same time, m one ends of the insulated conductor bars in all shunt exciting winding units are electrically connected with m N-pole corresponding electric brushes in all the electric brushes to form m second electrical connection points; and m series excitation ends of insulated conductor bars in all series exciting winding units are connected to the m first electrical connection points respectively; at the same time, m other series excitation ends of the insulated conductor bars in the series excitation winding unit form m first terminals; or, m other series excitation ends of insulated conductor bars in all series exciting winding units are connected to the m first electrical connection points respectively; at the same time, m series excitation ends of the insulated conductor bars in the series excitation winding unit form m first terminals, m second electrical connection points form m second terminals, m first terminals and m second terminals respectively form m pairs of external connection terminals, m pairs of external connection terminals and m pairs of power output terminals are connected in a one-to-one correspondence, m is a positive integer not less than 2, and w is 1, 2 or 4; therefore, on the one hand, a branch circuit composed of each shunt exciting winding unit and the pair of electric brushes and the series exciting winding unit that are in corresponding connection is mutually independent; current of each branch circuit is also independent; each branch circuit can independently work and power of each branch circuit is independently provided by one pair of corresponding power output terminals, i.e., each pair of the power output terminals only undertakes operating current of one branch circuit, wherein the operating current is only 1/m of rated input current of the motor. Therefore, even for the motor having extremely large rated input current, as long as the m is greater enough, the operating current of each branch circuit or output current of each pair of the power output terminals will be correspondingly decreased, so that according to the low enough output current of the power output terminals, requirements on the high-power high-performance motor can be met without adopting a parallel current evenness technology but by using an ordinary power switch tube or a power module. Moreover, cost of the chopper is decreased; requirements of connecting wires and connectors between the external wiring terminals and the power output terminals on contact resistance and insulation are lowered; production and manufacture difficulty is lowered; and reliability and safety of the system are increased.

On the other hand, since the control signal includes the m unit control signals that respectively correspond to the m chopping units and are formed according to the preset phase stagger rule, current ripple phases of each pair of the power output terminals are mutually different. Therefore, the peak values of ripple peaks of the m superposed current ripples are decreased; peak values of ripple peaks of the output torque and the rotation speed are further decreased; and the performance of the shunt series wound DC motor is improved, with service life of the motor prolonging.

Moreover, when the electric brushes, the exciting winding units and the connecting wires in the motor fail, only the parts at which failures are located shall be masked, and the other normal parts may still work. Thus, a phenomenon that the traditional shunt series wound DC motor is suddenly out of control in the case of failure can be avoided; and the reliability and safety of the system are increased.

In summary, the shunt series wound DC motor driving device of the present embodiments one to three has simple structure, short connection lines, simple production process, easy manufacture, convenient maintenance, low production cost and maintenance cost, and has the advantages of reasonable structural design, simplicity, high reliability and safety. Therefore, the present invention can be applied to heavy-load electrical equipment such as electric cars, electric trucks, track cars, sightseeing tourist cars, trucks and ships, and can be further applied to high-performance electrical equipment such as numerically-controlled machine tools and submarines.

<Variations>

Figure 15:
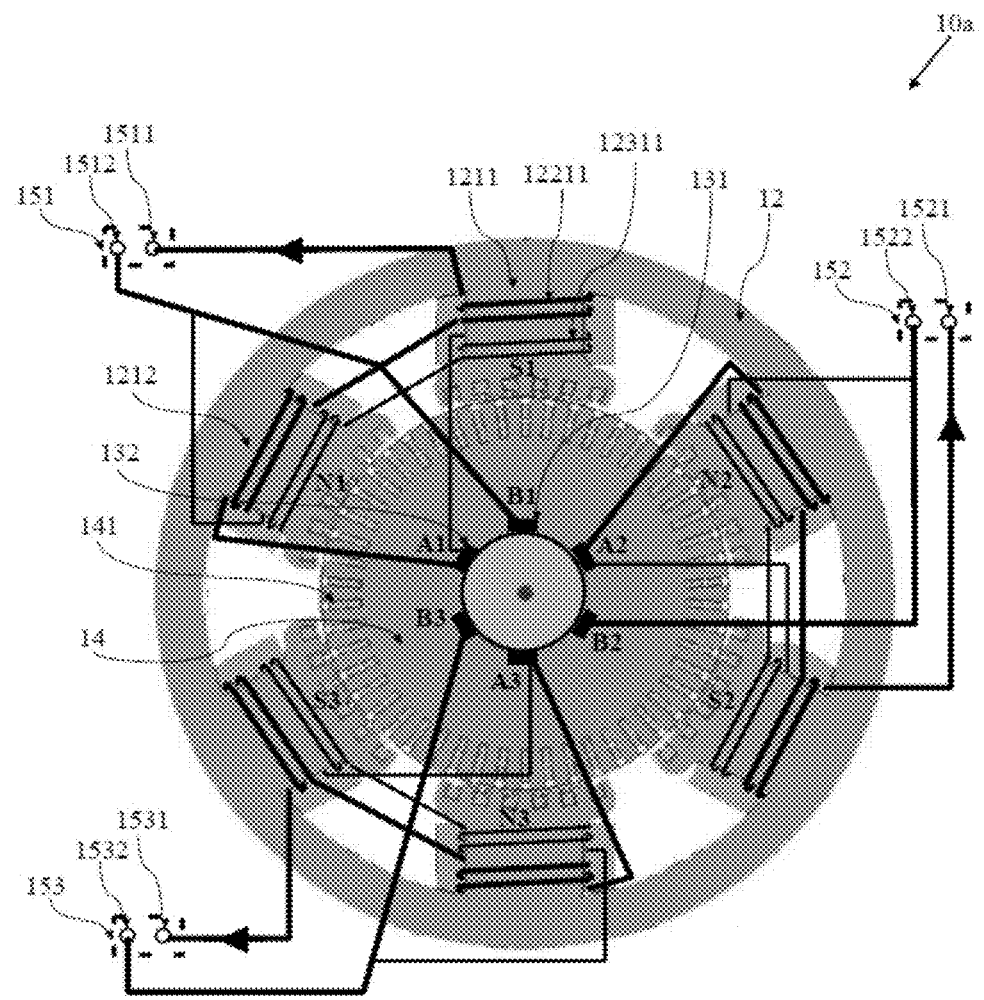
FIG. 15 is a schematic diagram of circuit connection of a transverse section of a shunt series wound DC motor in deformations of the present invention.

In this variation, with respect to the same structure as embodiment four, the same symbol is given, and the same description is omitted. As shown in FIG. 15, m is set as 3; the m series exciting winding units of the shunt series wound DC motor 10a respectively correspond to the m pairs of main poles; the insulated conductor strips in each of the series exciting winding units are formed on one pair of corresponding main poles; the m shunt exciting winding units respectively correspond to the m pairs of main poles; and the insulated conductor strips in each of the shunt exciting winding units are formed on one pair of corresponding main poles. The series exciting coils in the series exciting winding units on each of the main poles have the same number of turns; the shunt exciting coils in the shunt exciting winding units on each of the main poles have the same number of turns; each pair of the main poles corresponds to spatial positions of one pair of corresponding electric brushes; in each of the series exciting winding units, a connection relationship between two series exciting coils is any one of series connection and parallel connection, and the connection relationship of every two series exciting coils in each of the series exciting winding units is the same; and in each of the shunt exciting winding units, a connection relationship between two shunt exciting coils is any one of series connection and parallel connection, and the connection relationship of every two shunt exciting coils in each of the shunt exciting winding units is the same.

The shunt series wound DC motor 10a may replace the shunt series wound DC motor 10 of the embodiment one to three, and has the effects of the embodiment one to three, and can output a larger effective torque when the motor fails and partial units of the motor shall be shielded because a magnetic field excited by the exciting winding units at non-failed parts mainly acts on an armature winding branch connected with the corresponding electric brushes.

The foregoing embodiments are preferred cases of the present invention, rather than limiting the protection scope of the present invention.

For example, on the occasion that the requirements on the armature current, the rotation speed and the torque of the shunt series wound DC motor are high during steady-state operation, the m may be based on the corresponding peak values of the corresponding ripple peaks of the armature current, the rotation speed and the torque and ripple factor.

The invention claimed is:

1. A shunt series wound DC motor driving device, characterized by comprising:
   a shunt series wound DC motor with a rated voltage;
   a DC power supply having a constant voltage that corresponds to the rated voltage; and
   a chopper for converting the constant voltage into a variable voltage based on a control signal and providing the variable voltage to the shunt series wound DC,
   wherein, the chopper has m chopping units;
   each of the chopping units is provided with a first power output end, a second power output end and w switching control ends;
   the control signal includes m unit control signals respectively corresponding to the m chopping units and formed according to a preset phase stagger rule
   each of the unit control signals comprises w switching control signals corresponding to the w switch control ends in the corresponding chopping units;
   the w switching control ends are used to correspondingly receive the w switching control signals;
   the m first power output ends of all the chopping units and the m second power output ends of all the chopping units correspondingly form m pairs of power output terminals;
   the shunt series wound DC motor includes:
   m pairs of electric brushes;
   a stator, comprising m pairs of main poles corresponding to the m pairs of brushes and comprising a series exciting winding part, and a shunt exciting winding part; and
   a rotor, arranged in the stator and comprising a plurality of armature windings that are connected to each other in a preset connection manner;
   each pair of the main poles includes an S-polarity main pole and an N-polarity main pole;
   two adjacent main poles have different polarities;
   the positions of the two brushes in each pair of the brushes are adjacent;
   each pair of the electric brushes comprises an S-pole corresponding electric brush that corresponds to the S-polarity main pole and an N-pole corresponding electric brush that corresponds to the N-polarity main pole;
   the series exciting winding part contains m series exciting winding units, the shunt exciting winding part contains m shunt exciting winding units, each of the series exciting winding units is formed by series exciting coils made from an insulated conductor strips composed of metal wires wrapped with an insulating layer on at least a pair of the main poles;

each of the shunt exciting winding units is formed by respectively shunt exciting coils made from an insulated conductor strips composed of metal wires wrapped with an insulating layer on at least a pair of the main poles;

the insulated conductor strip in each of the series exciting winding units is provided with one series excitation end and the other series excitation end;

the insulated conductor strip in each of the shunt exciting winding units is provided with one shunt excitation end and the other shunt excitation end;

the m shunt excitation ends of all the insulated conductor strips in all the shunt exciting winding units are electrically connected with the m S-pole corresponding brushes in all the electric brushes to form m first electrical connection points; at the same time, the m other ends of the insulated conductor strips in all the shunt exciting winding units correspond to the m N-pole corresponding electric brushes in all the electric brushes to form m second electrical connection points; or, m other shunt excitation end in all the insulated conductor strips in the shunt exciting winding unit are electrically connected with the m S-pole corresponding electric brushes in all the electric brushes to form m first electrical connection points; at the same time, the m one ends of the insulated conductor strip in all the shunt exciting winding units are electrically connected with m N-pole corresponding electric brushes in all the electric brushes to form m second electrical connection points;

the m series excitation ends of the all insulated conductor strips in all the series exciting winding units are connected with the m first electric connection points respectively and correspondingly; at the same time, the other series excitation ends of the insulated conductor strips in all the series exciting winding units form the m first wiring terminals; or, the other series excitation ends of the insulated conductor strips in all the series exciting winding units are connected with the m first electrical connection points respectively and correspondingly; at the same time, the m series excitation ends of conductor strips in all the series exciting winding units form m first wiring terminals;

the m second electrical connection points form m second wiring terminals;

the m first wiring terminals and the m second wiring terminals respectively form m pairs of external wiring terminals;

the m pairs of external wiring terminals are connected with the m pairs of power output terminals in a one-to-one correspondence;

the m is a positive integer not less than 2, and the w is 1, 2 or 4.

2. The shunt series wound DC motor driving device according to claim 1, characterized in that:

wherein the w is 1, each chopping unit further comprises an upper bridge arm and a lower bridge arm connected in series with each other;

the upper bridge arm is connected with the positive pole of the DC power supply, and the lower bridge arm is connected with the negative pole of the DC power supply;

the upper bridge arm comprises at least one power switch tube and the switching control end;

each power switch tube comprises a control pole;

the switching control end is formed based on the control pole;

the lower bridge arm comprises at least one diode;

the first power output end is arranged between the upper bridge arm and the lower bridge arm, and the second power output end is arranged at the connection end of the lower bridge arm and the DC power supply.

3. The shunt series wound DC motor driving device according to claim 2, characterized in that:

wherein the preset phase stagger rule is that the phases of the m switching control signals are respectively staggered by 1/m switching cycle in sequence; or, the m is an even number, preset phase stagger rule is that the phases of m switching control signals are sequentially staggered by 2/m switching cycle in sequence.

4. An electrical equipment, characterized by comprising:

a shunt series wound DC motor driving device, wherein the shunt series wound DC motor driving device is the shunt series wound DC motor driving device according to claim 3.

5. An electrical equipment, characterized by comprising:

a shunt series wound DC motor driving device, wherein the shunt series wound DC motor driving device is the shunt series wound DC motor driving device according to claim 2.

6. The shunt series wound DC motor driving device according to claim 1, characterized in that:

wherein the w is 2, each chopping unit also comprises an upper bridge arm and a lower bridge arm connected in series with each other;

the upper bridge arm is connected with the positive pole of the DC power supply, and the lower bridge arm is connected with a negative pole of the DC power supply;

the upper bridge arm and the lower bridge arm respectively comprise at least one power switch tube, and at least one diode connected with the power switch tube in reverse parallel connection, and a switching control end;

each power switch tube comprises a control pole;

and the switching control end is formed based on the control pole;

the switching control end in the upper bridge arm is used as an upper bridge arm switching control end, and the switching control end in the lower bridge arm is used as a lower bridge arm switching control end, used for correspondingly receiving two switch control signals;

the first power output end is arranged between the upper bridge arm and the lower bridge arm, and the second power output end is arranged at the connection end of the lower bridge arm and the DC power supply.

7. The shunt series wound DC motor driving device according to claim 6, characterized in that:

wherein in each chopping unit, the switching control signal corresponding to the upper bridge arm switching control end is set as a reference switching control signal; and a phase of the reference switching control signal is set according to the preset phase corresponding to the unit control signal; the switching control signal corresponding to the lower bridge arm switching control end is set reciprocal to the reference switching control signal;

preset phase stagger rule is that m phases respectively corresponding to the m unit control signals and serving as m preset phases are sequentially staggered by 1/m switching cycle; or, m is an even number, the preset phase stagger rule is that the m phases respectively corresponding to the m unit control signals and serving as the m preset phases are sequentially staggered by 2/m switching cycle.

8. An electrical equipment, characterized by comprising: a shunt series wound DC motor driving device,
wherein the shunt series wound DC motor driving device is the shunt series wound DC motor driving device according to claim 7.

9. An electrical equipment, characterized by comprising: a shunt series wound DC motor driving device,
wherein the shunt series wound DC motor driving device is the shunt series wound DC motor driving device according to claim 6.

10. The shunt series wound DC motor driving device according to claim 1, characterized in that:
wherein w is 4,
each of the chopping units comprises a first bridge arm and a second bridge arm connected in parallel with each other;
the first bridge arm comprises a first upper bridge arm and a first lower bridge arm connected in series with each other, the second bridge arm comprises a second upper bridge arm and a second lower bridge arm connected in series with each other;
the first upper bridge arm and the second upper bridge arm are connected with the positive pole of the DC power supply, and the first lower bridge arm and the second lower bridge arm are connected with the negative pole of the DC power supply;
the first upper bridge arm, the first lower bridge arm, the second upper bridge arm and the second lower bridge arm respectively comprise at least one power switch tube, at least one diode connected in in reverse parallel connection with the power switch tube, and a switching control end;
each power switch tube comprises one control pole;
the switching control end is formed based on the control pole,
the switching control end in the first upper bridge arm is used as a first upper bridge arm switching control end, a switching control end in the first lower bridge arm is used as a first lower bridge arm switching control end, and the switching control end in the second upper bridge arm is used as a second upper bridge arm switching control end, and the switching control end in the second lower bridge arm is used as the second lower bridge arm switching control end, used for correspondingly receiving the four switching control signals;
the first power output end is arranged between the first upper bridge arm and the first lower bridge arm, and the second power output end is arranged between the second upper bridge arm and the second lower bridge arm.

11. The shunt series wound DC motor driving device according to claim 10, characterized in that:
wherein in each of the chopping units, the two switching control signals corresponding to the first upper bridge arm switching control end and the second lower bridge arm switching control end are set as reference switching control signals; phase of the reference switching control signals are set according to the preset phases corresponding to the unit control signals, the two switching control signals corresponding to the first lower arm switching control end and the second upper bridge arm switching control end are reciprocal to the reference switching control signals;

the preset phase stagger rule is that the m phases respectively corresponding to the m unit control signals and serving as the m preset phases are sequentially staggered by 1/m switching cycle; or, m is an even number, the preset phase stagger rule is that the m phases respectively corresponding to the m unit control signals and serving as m preset phases are sequentially staggered by 2/m switching cycle.

12. An electrical equipment, characterized by comprising: a shunt series wound DC motor driving device,
wherein the shunt series wound DC motor driving device is the shunt series wound DC motor driving device according to claim 10.

13. The shunt series wound DC motor driving device according to claim 1, characterized in that:
wherein, the m series exciting winding units correspond to the m pairs of the main poles respectively;
the insulated conductor strip in each of the series exciting winding units is formed on one corresponding pair of main poles;
the m shunt exciting winding units correspond to m pairs of main poles respectively;
the insulated conductor strip in each shunt exciting winding unit is formed on one corresponding pair of main poles.

14. The shunt series wound DC motor driving device according to claim 13, characterized in that:
wherein series exciting coils in the series exciting winding units on the various main poles have the same number of turns;
shunt exciting coils in the shunt exciting winding units on the various main poles have the same number of turns;
the series exciting coils and the shunt exciting coils on each of the main poles have the same current surrounding direction;
each pair of the main poles corresponds to the spatial position of the one corresponding pair of electric brushes;
in each of the series exciting winding units, the connection relationship of the two series exciting coils is any one of series and parallel;
the connection relationship of the two series exciting coils in each series exciting winding units is the same;
in each of the shunt exciting winding units, the connection relationship of the two shunt exciting coils is any one of series and parallel;
the connection relationship of the two shunt exciting coils in each shunt exciting winding units is the same.

15. The shunt series wound DC motor driving device according to claim 1, characterized in that:
wherein the insulated conductor strips in each of series exciting winding units is formed on the m pairs of main poles;
the insulated conductor strips in each of shunt exciting winding units is formed on the m pairs of main poles.

16. The shunt series wound DC motor driving device according to claim 15, characterized in that:

wherein series exciting coils in the series exciting winding units on the each of main poles have the same number of turns;
the shunt exciting coils in the shunt exciting winding units on the each of main poles have the same number of turns;
the series exciting coils and the shunt exciting coils on each of the main poles have the same current surrounding direction;
in each of the series exciting winding units, the connection relationship of the 2m series exciting coils is any one of series, parallel and series-parallel;
the connection relationship of the 2m series exciting coils in each series exciting winding unit is the same,
in each of the shunt exciting winding units, the connection relationship of the 2m shunt exciting coils is any one of series, parallel and series-parallel;
the connection relationship of the 2m shunt exciting coils in each shunt exciting winding units is the same.

17. The shunt series wound DC motor driving device according to claim 1, characterized in that:
wherein the preset connection manner is any one of single lap, multiplex lap and compound ripple.

18. An electrical equipment, characterized by comprising:
a shunt series wound DC motor driving device,
wherein the shunt series wound DC motor driving device is the shunt series wound DC motor driving device according to claim 17.

19. An electrical equipment according to claim 18, characterized in that:
wherein the electrical equipment is any one of electric trucks, track cars, sightseeing tourist cars, trucks and ships.

20. An electrical equipment, characterized by comprising:
a shunt series wound DC motor driving device,
wherein the shunt series wound DC motor driving device is the shunt series wound DC motor driving device according to claim 1.

* * * * *